United States Patent
Wexler et al.

(10) Patent No.: US 10,845,005 B2
(45) Date of Patent: Nov. 24, 2020

(54) TANK FILLING SYSTEM AND METHOD

(71) Applicant: Other Lab, LLC, San Francisco, CA (US)

(72) Inventors: Jason Stein Wexler, San Francisco, CA (US); Durward Kimball Stone, Oakland, CA (US); Karthick Chandraseker, San Francisco, CA (US)

(73) Assignee: Other Lab, LLC, San Francisco, CA (US)

(*) Notice: Subject to any disclaimer, the term of this patent is extended or adjusted under 35 U.S.C. 154(b) by 0 days.

(21) Appl. No.: 16/222,872

(22) Filed: Dec. 17, 2018

(65) Prior Publication Data
US 2019/0120432 A1    Apr. 25, 2019

Related U.S. Application Data

(63) Continuation of application No. 15/940,862, filed on Mar. 29, 2018.
(Continued)

(51) Int. Cl.
*F17C 5/06* (2006.01)
*F17C 13/02* (2006.01)
(Continued)

(52) U.S. Cl.
CPC ............ *F17C 5/06* (2013.01); *F17C 5/007* (2013.01); *F17C 13/026* (2013.01); *F17C 13/04* (2013.01);
(Continued)

(58) Field of Classification Search
CPC .......... F17C 5/06; F17C 5/007; F17C 13/026; F17C 13/04; F17C 2201/0138;
(Continued)

(56) References Cited

U.S. PATENT DOCUMENTS 2,025,038 A    12/1935    Cannon
2,380,372 A     7/1945    Alderfer
(Continued)

FOREIGN PATENT DOCUMENTS

CA    2636100 A1    12/2009
CN    1036534 A     10/1989
(Continued)

OTHER PUBLICATIONS

DeMiguel et al., "The role of initial tank temperature on refuelling of on-board hydrogen tanks," Nov. 20, 2015, available online Apr. 22, 2016, retrieved Jul. 18, 2019, from https://www.sciencedirect.com/science/article/pii/S0360319915315391, 10 pages.
(Continued)

*Primary Examiner* — Timothy L Maust
*Assistant Examiner* — Christopher M Afful
(74) *Attorney, Agent, or Firm* — Davis Wright Tremaine LLP

(57) ABSTRACT

A Venturi filling system having a first filling coupler configured to be coupled to a first set of fittings disposed at a first tank end of a tank; a second filling coupler configured to be coupled to a second set of fittings disposed at a second tank end of the tank; and a Venturi assembly that includes: a Venturi mixing chamber, the Venturi mixing chamber communicating with the first filling coupler; a Venturi nozzle configured to introduce a first flow of fluid from a fluid source to the Venturi mixing chamber of the Venturi assembly; and an suction inlet communicating with the second filling coupler and coupled with the Venturi chamber and configured to receive a second flow of fluid originates from the second filling coupler such that the second flow of fluid flows into the Venturi chamber and mixes with the first fluid flow within the Venturi mixing chamber.

14 Claims, 17 Drawing Sheets

Related U.S. Application Data

(60) Provisional application No. 62/620,935, filed on Jan. 23, 2018, provisional application No. 62/479,699, filed on Mar. 31, 2017.

(51) Int. Cl.
  *F17C 13/04*   (2006.01)
  *F17C 5/00*   (2006.01)

(52) U.S. Cl.
  CPC .............. F17C 2201/0138 (2013.01); F17C 2201/0195 (2013.01); F17C 2203/0604 (2013.01); F17C 2205/0111 (2013.01); F17C 2205/037 (2013.01); F17C 2205/0332 (2013.01); F17C 2205/0338 (2013.01); F17C 2205/0341 (2013.01); F17C 2209/21 (2013.01); F17C 2209/2109 (2013.01); F17C 2221/011 (2013.01); F17C 2221/012 (2013.01); F17C 2221/018 (2013.01); F17C 2221/033 (2013.01); F17C 2221/035 (2013.01); F17C 2223/0123 (2013.01); F17C 2223/0161 (2013.01); F17C 2223/035 (2013.01); F17C 2223/036 (2013.01); F17C 2225/0123 (2013.01); F17C 2250/034 (2013.01); F17C 2250/043 (2013.01); F17C 2250/0439 (2013.01); F17C 2250/075 (2013.01); F17C 2270/0139 (2013.01)

(58) Field of Classification Search
  CPC ...... F17C 2201/0195; F17C 2203/0604; F17C 2205/0111; F17C 2205/0332; F17C 2205/0338; F17C 2205/0341; F17C 2205/037; F17C 2209/21; F17C 2209/2109; F17C 2221/011; F17C 2221/012; F17C 2221/018; F17C 2221/033; F17C 2221/035; F17C 2223/0123; F17C 2223/0161; F17C 2223/035; F17C 2223/036; F17C 2225/0123; F17C 2250/034; F17C 2250/043; F17C 2250/075; F17C 2270/0139
  See application file for complete search history.

(56) References Cited

U.S. PATENT DOCUMENTS

| | | | |
|---|---|---|---|
| 3,579,402 A | 5/1971 | Goldsworthy | |
| 4,139,019 A | 2/1979 | Bresie et al. | |
| 4,253,454 A | 3/1981 | Warncke | |
| 4,432,302 A | 2/1984 | Farris et al. | |
| 4,932,403 A | 6/1990 | Scholley | |
| 5,036,845 A | 8/1991 | Scholley | |
| 5,040,933 A | 8/1991 | Lee et al. | |
| 5,127,307 A | 7/1992 | Pimpis | |
| 5,653,358 A | 8/1997 | Sneddon | |
| 5,830,400 A | 11/1998 | Huvey et al. | |
| 5,839,383 A | 11/1998 | Stenning et al. | |
| 6,047,860 A | 4/2000 | Sanders | |
| 6,116,464 A | 9/2000 | Sanders | |
| 6,293,590 B1 | 9/2001 | Ogasa | |
| 6,453,920 B1 | 9/2002 | Izuchukwu et al. | |
| 6,494,497 B1 | 12/2002 | Kertesz | |
| 6,513,523 B1 | 2/2003 | Izuchukwu et al. | |
| 6,527,075 B1 | 3/2003 | Izuchukwu et al. | |
| 6,579,401 B1 | 6/2003 | Izuchukwu et al. | |
| 6,676,159 B1 | 1/2004 | Sellergren | |
| 7,735,528 B2* | 6/2010 | Handa | F17C 5/007 141/82 |
| 7,757,727 B2 | 7/2010 | Handa | |
| 9,217,538 B2* | 12/2015 | Griffith | F17C 1/005 |
| 9,279,541 B2* | 3/2016 | Cohen | F17C 7/00 |
| 9,850,852 B2 | 12/2017 | Kondogiani et al. | |
| 2004/0145091 A1 | 7/2004 | Willig et al. | |
| 2004/0216656 A1 | 11/2004 | Fitzpatrick et al. | |
| 2004/0250871 A1 | 12/2004 | Bingham et al. | |
| 2004/0256016 A1 | 12/2004 | Arima et al. | |
| 2005/0205137 A1 | 9/2005 | Pouchkarev | |
| 2006/0006645 A1 | 1/2006 | Mukawa et al. | |
| 2007/0075085 A1 | 4/2007 | Arnold et al. | |
| 2007/0221281 A1 | 9/2007 | Takagi | |
| 2008/0098562 A1 | 5/2008 | Tagliaferri et al. | |
| 2009/0308475 A1 | 12/2009 | Stringfellow et al. | |
| 2010/0075200 A1 | 3/2010 | Hatta | |
| 2011/0041518 A1 | 2/2011 | Peterson et al. | |
| 2012/0161434 A1 | 6/2012 | Wells | |
| 2013/0092311 A1 | 4/2013 | Kobayashi | |
| 2013/0092561 A1 | 4/2013 | Wellnitz | |
| 2013/0125740 A1 | 5/2013 | Kang et al. | |
| 2013/0154257 A1 | 6/2013 | Ault | |
| 2013/0299503 A1 | 11/2013 | Griffith et al. | |
| 2014/0305951 A1* | 10/2014 | Griffith | F17C 1/00 220/581 |
| 2015/0034233 A1 | 2/2015 | Hatta et al. | |
| 2015/0048095 A1 | 2/2015 | Sanders | |
| 2015/0177172 A1 | 6/2015 | Upasani et al. | |
| 2015/0308621 A1* | 10/2015 | Mathison | F17C 5/007 141/4 |
| 2016/0018057 A1 | 1/2016 | Griffith et al. | |
| 2016/0363265 A1 | 12/2016 | Griffith et al. | |
| 2017/0145961 A1 | 5/2017 | Myers et al. | |
| 2017/0159862 A1 | 6/2017 | Vizzarri | |
| 2018/0029465 A1 | 2/2018 | Abd Elhamid et al. | |
| 2018/0080609 A1 | 3/2018 | Abd Elhamid et al. | |
| 2018/0111302 A1 | 4/2018 | Kondogiani et al. | |
| 2019/0264839 A1 | 8/2019 | Powell et al. | |

FOREIGN PATENT DOCUMENTS

| | | |
|---|---|---|
| CN | 1231639 A | 10/1999 |
| CN | 2416338 Y | 1/2001 |
| CN | 1306173 A | 8/2001 |
| CN | 2542907 Y | 4/2003 |
| CN | 1518511 A | 8/2004 |
| EP | 0767338 A2 | 4/1997 |
| EP | 2404872 A1 | 1/2012 |
| EP | 3141793 A1 | 3/2017 |
| RU | 42863 U1 | 12/2004 |
| RU | 81568 U1 | 3/2009 |
| RU | 2426024 C2 | 8/2011 |
| RU | 141427 U1 | 6/2014 |
| WO | 9012982 A1 | 11/1990 |
| WO | 9814362 A1 | 4/1998 |
| WO | 200195967 A1 | 12/2001 |
| WO | 2001095966 A1 | 12/2001 |
| WO | 0239010 A2 | 5/2002 |
| WO | 2008081401 A1 | 7/2008 |
| WO | 2010107317 A1 | 9/2010 |
| WO | 2013056785 A2 | 4/2013 |
| WO | 2013166452 A1 | 11/2013 |
| WO | 2014123928 A1 | 8/2014 |

OTHER PUBLICATIONS

International Search Report and Written Opinion dated Aug. 27, 2013, International Patent Application No. PCT/US2013/039565, filed May 3, 2013, 13 pages.

International Search Report and Written Opinion dated Feb. 21, 2018, International Patent Application No. PCT/US2017/058068, filed Oct. 24, 2017, 8 pages.

International Search Report and Written Opinion dated Jun. 21, 2018, International Patent Application No. PCT/US2018/025280, filed Mar. 29, 2018, 7 pages.

International Search Report and Written Opinion dated Jun. 28, 2018, International Patent Application No. PCT/US2018/025283, filed Mar. 29, 2018, 8 pages.

(56) References Cited

OTHER PUBLICATIONS

International Search Report and Written Opinion dated Mar. 16, 2017, International Patent Application No. PCT/US2016/064796, filed Dec. 2, 2016, 6 pages.
International Search Report and Written Opinion dated Mar. 23, 2017, International Patent Application No. PCT/US2016/037633, 8 pages.
International Search Report and Written Opinion dated May 14, 2014, International Patent Application No. PCT/US2014/014729, filed Feb. 4, 2014, 11 pages.
Reddi et al., "Impact of hydrogen SAE J2601 fueling methods on fueling time of light-duty fuel cell electric vehicles," May 16, 2017, retrieved Jul. 18, 2019, from https://www.osti.gov/servlets/purl/1389635, 23 pages.
Schneider, "SAE J2601—Worldwide Hydrogen Fueling Protocol: Status, Standardization & Implementation," Jul. 10, 2012, retrieved Jul. 18, 2019, from https://ww2.energy.ca.gov/contracts/notices/2012-07-10_workshop/presentations/SAE_Jesse_Schneider_Fueling_Protocol.pdf, 32 pages.
U.S. Appl. No. 13/887,201, filed May 3, 2013.
U.S. Appl. No. 14/172,831, filed Feb. 4, 2014.
U.S. Appl. No. 15/183,614, filed Jun. 15, 2016.
U.S. Appl. No. 14/624,370, filed Feb. 17, 2015.
U.S. Appl. No. 15/232,355, filed Aug. 9, 2016.
U.S. Appl. No. 15/368,182, filed Dec. 2, 2016.
U.S. Appl. No. 15/627,814, filed Jun. 20, 2017.
U.S. Appl. No. 15/792,090, filed Oct. 24, 2017.
U.S. Appl. No. 15/940,793, filed Mar. 29, 2018.
U.S. Appl. No. 15/940,862, filed Mar. 29, 2018.

\* cited by examiner

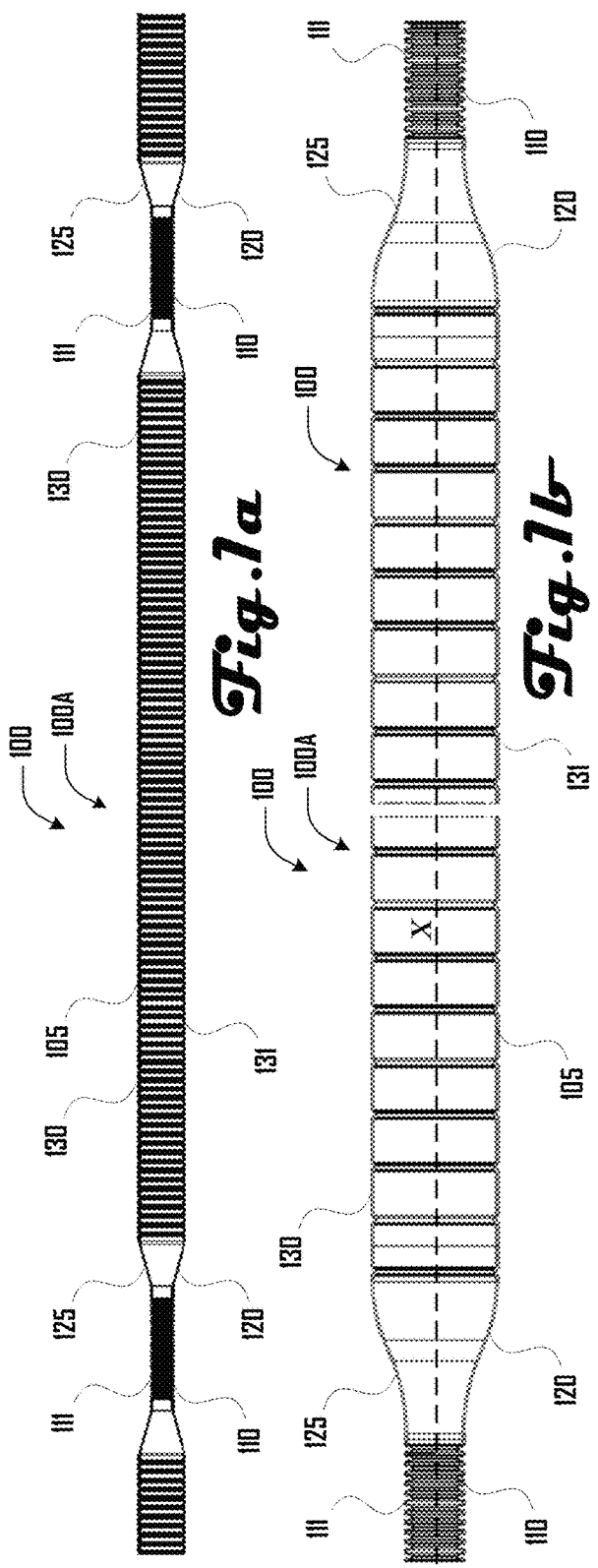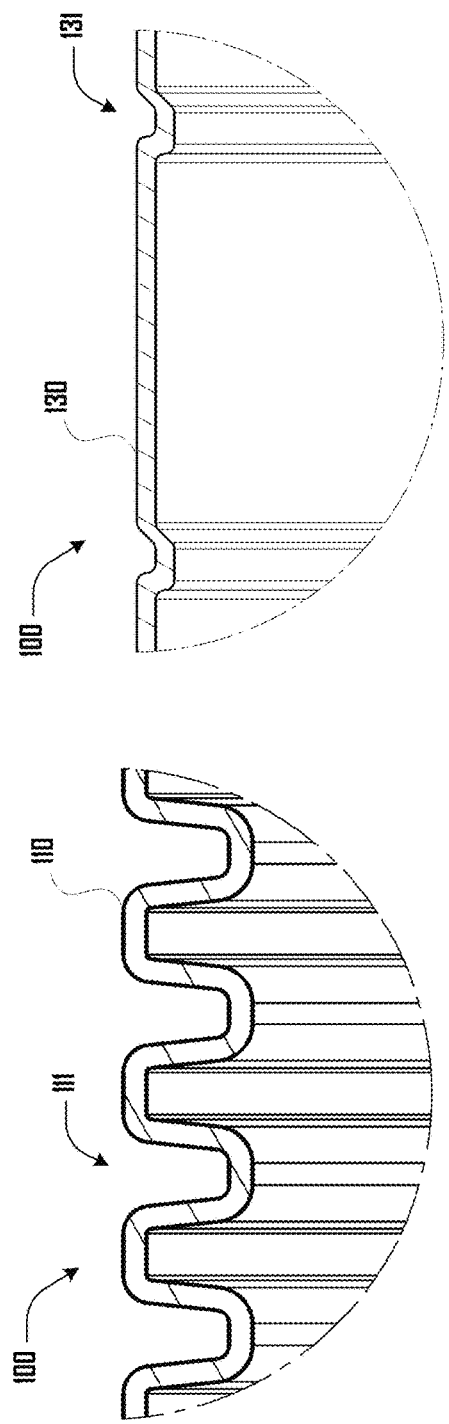

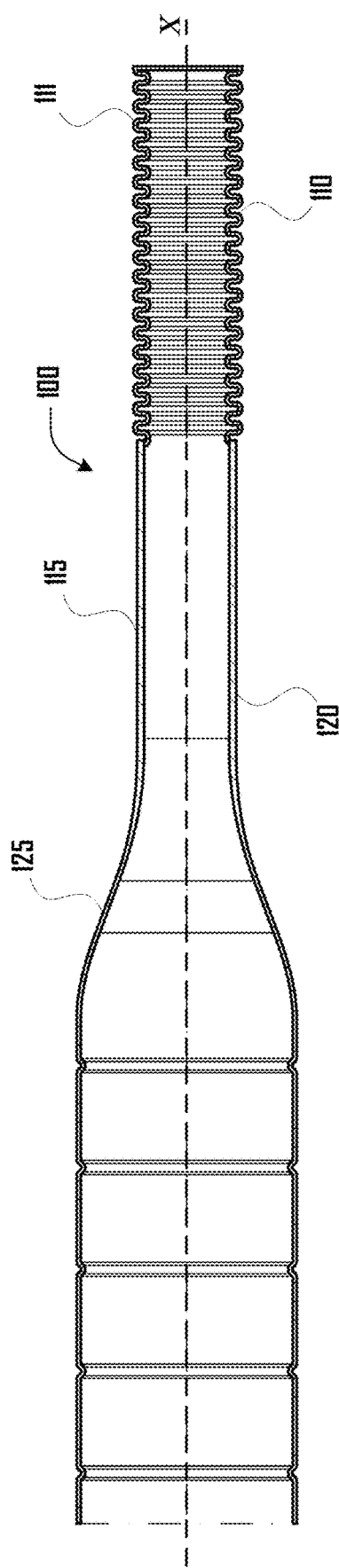

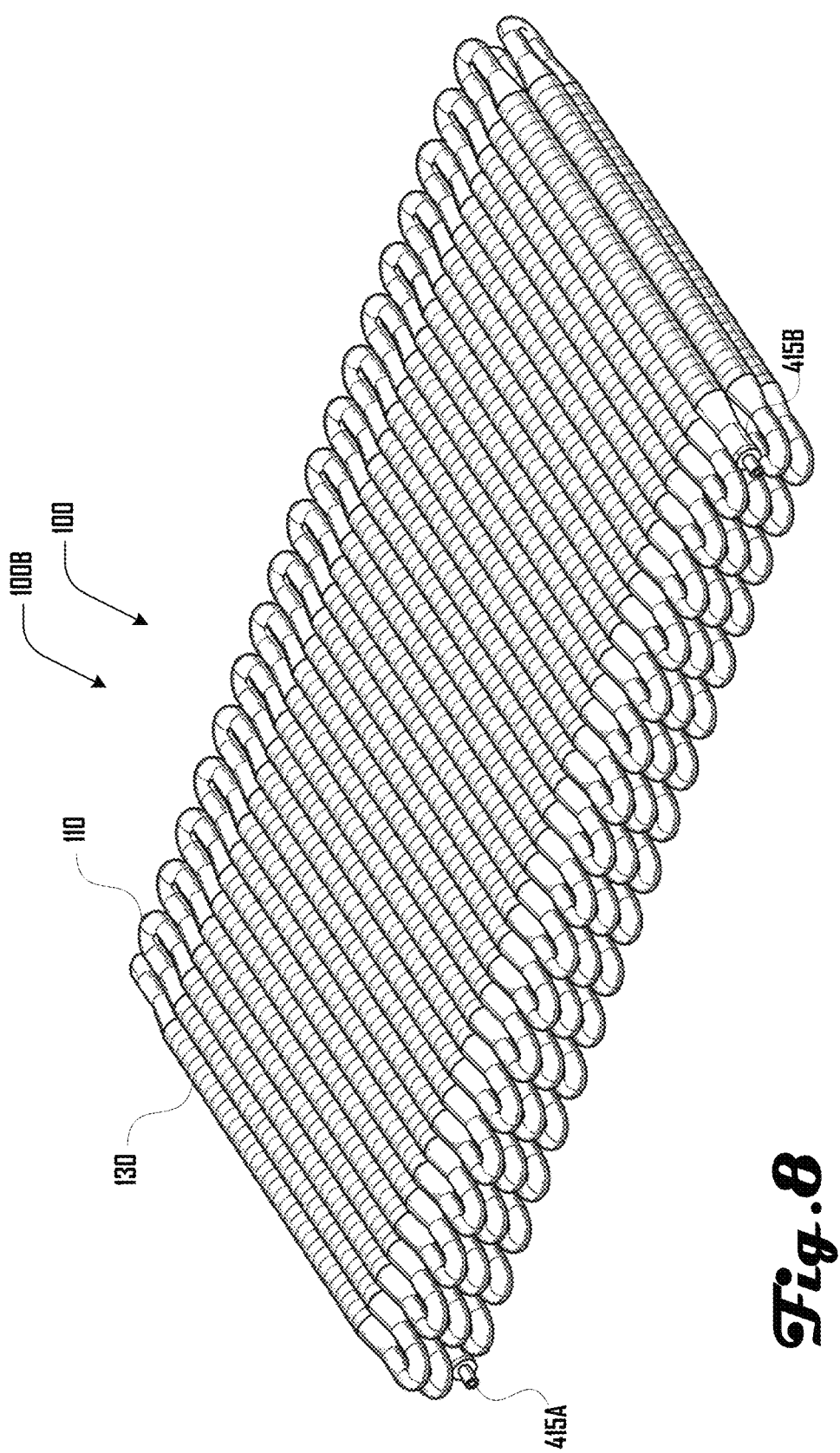

| "Conventional" 5 kg 70 MPa Type IV HDPE tank | | |
|---|---|---|
| Parameter | Value | Unit |
| Total length | 800 | mm |
| External diameter | 553 | mm |
| Wall thickness liner | 5 | mm |
| Wall thickness composite | 35.334 | mm |
| Liner density | 945 | kg/m³ |
| Liner thermal conductivity | 0.5 | W/(m*K) |
| Liner specific heat capacity | 2100 | J/(kg*K) |
| Composite density | 1494 | kg/m³ |
| Composite thermal conductivity | 0.5 | W/(m*K) |
| Composite specific heat capacity | 1120 | J/(kg*K) |

*Fig. 9a*

| Case # | Precool Temp. | Heat transfer to ambient |
|---|---|---|
| 1 | -33°C | 5 W/m²K |
| 2 | 0°C | 5 W/m²K |
| 3 | none | 5 W/m²K |
| 4 | 0°C | 0 W/m²K |

*Fig. 9b*

| Tank | Precool | Time | $P_{avg}$ | $T_{avg}$ |
|---|---|---|---|---|
| Conventional | -33°C | 248 s | 88 MPa | 87°C |
| Conventional | none | 279 s | 100 MPa | 136°C |
| Volute | -33°C | 242 s | 86 MPa | 62°C |
| Volute | none | 240 s | 85 MPa | 83°C |

Fig. 11

TANK FILLING SYSTEM AND METHOD

CROSS-REFERENCE TO RELATED APPLICATIONS

This application is a continuation of U.S. application Ser. No. 15/940,862, filed Mar. 29, 2018, which is a non-provisional of and claims priority to U.S. Provisional applications entitled "FAST-FILL TANK SYSTEM AND METHOD" and "TANK FILLING SYSTEM AND METHOD" and respectively having application Nos. 62/479,699 and 62/620,935 respectively filed Mar. 31, 2017 and Jan. 23, 2018. These applications are hereby incorporated herein by reference in their entirety and for all purposes.

This application is related to U.S. application Ser. No. 13/887,201 filed May 3, 2013; U.S. application Ser. No. 14/172,831 filed Feb. 4, 2014; U.S. application Ser. No. 15/183,614 filed Jun. 15, 2016; U.S. application Ser. No. 14/624,370 filed Feb. 17, 2015; U.S. application Ser. No. 15/368,182 filed Dec. 2, 2016; U.S. application Ser. No. 15/792,090 filed Oct. 24, 2017; U.S. Application Ser. No. 62/479,598 filed Mar. 31, 2017; U.S. Application Ser. No. 62/479,699 filed Mar. 31, 2017. These applications are hereby incorporated herein by reference in their entirety and for all purposes.

BRIEF DESCRIPTION OF THE DRAWINGS

FIGS. 1a and 1b illustrate side views of a bare liner comprising a body having connector portions, taper portions and tubing portions.

FIG. 1c illustrates a close-up side view of corrugations of connector portions of a bare liner.

FIG. 1d illustrates a close-up side view of corrugations of tubing portions of a bare liner.

FIG. 3 illustrates a side view of a bare liner comprising a body having a connector portion with a cuff and corrugations, a taper portion and tubing portion.

FIG. 8 illustrates an example tank having one hundred and twelve chambers in accordance with one embodiment.

FIG. 9a illustrates parameters of a conventional tank used in a simulation study performed for the tank shown in FIG. 8.

FIG. 9b illustrates four cases used to perform a 3D and 1D simulation.

FIG. 11 is a table of data obtained in the simulations.

Figure 2A:
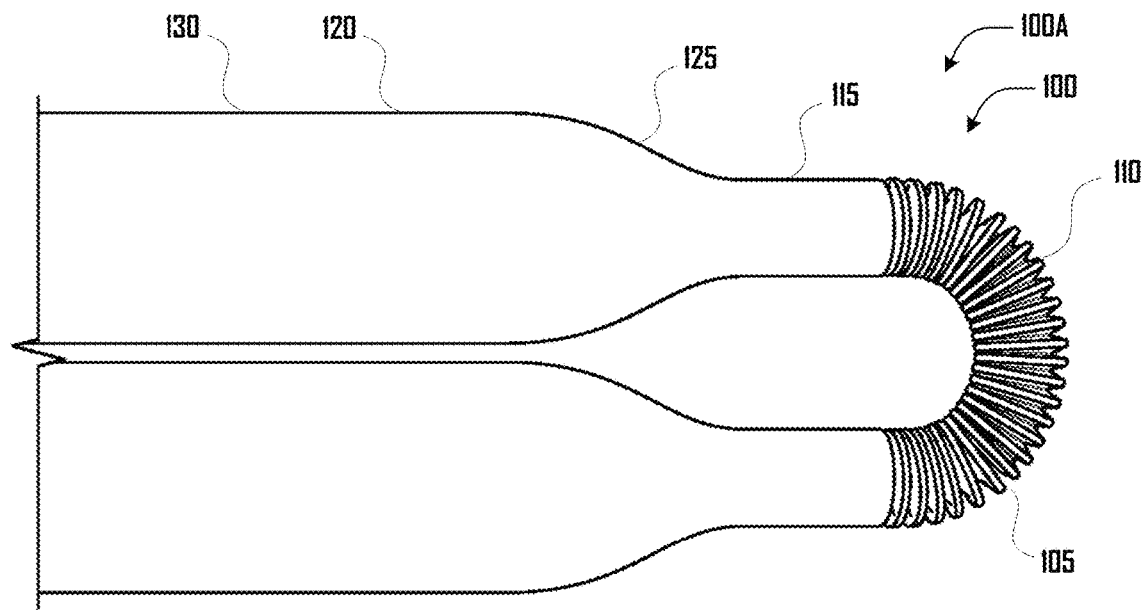
FIG. 2a illustrates a side view of a bare liner bending via corrugations of the connector portions.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Turning to FIGS. 1a-d, a bare liner 100A is shown as comprising a body 105 having connector portions 110, taper portions 125 and tubing portions 130. The connector portion 110 can be corrugated, which can allow the connector portion 110 to be flexible such that the liner 100 can be folded into a housing 300 as illustrated in FIGS. 3a and 3b. Non-corrugated portions 120 can be rigid in various embodiments.

Figure 2B:
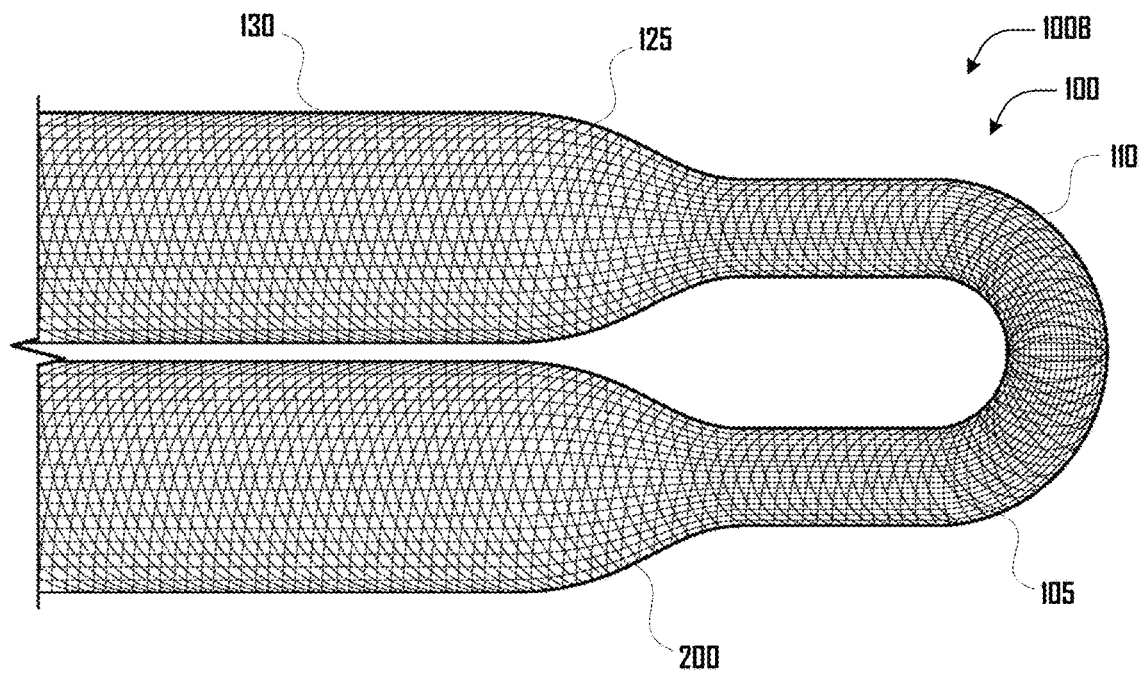
FIG. 2b illustrates a side view of the liner of FIG. 2a covered with braiding.

In various embodiments, the connector portion 110 can have a diameter that is smaller than the tubing portions 130, with the taper portion 125 providing a transition between the diameter of the connector portion 110 and the tubing portion 130. However, further embodiments can comprise a liner 100 with portions having one or more suitable diameter, and in further embodiments, a liner 100 can have portions that are non-cylindrical, which can include various suitable shapes. The connector portion 110 can comprise connector corrugations 111, which can allow the connector portion 110 to be flexible (e.g., as illustrated in FIGS. 2a and 2b) such that the liner 100 can be folded into a housing 300 as illustrated in FIGS. 3a and 3b.

Additionally, as illustrated in FIGS. 1a, 1b, 2a and 3 the connector portion 110 can comprise a cuff portion 115 defined by a non-corrugated portion 120 or rigid portion of the connector portion 110 between the corrugations 111 of the connector portion 110 and the taper portion 125. In further embodiments, the cuff portion 115 can be various sizes as illustrated in FIGS. 1a, 1b, 2a and 3. More specifically, FIGS. 1a and 1b illustrate a cuff portion 115 being smaller compared to the cuff portion 115 illustrated in FIGS. 2a and 3. In some embodiments, the cuff portion 115 can have a length that is less than, equal to, or greater than the length of the taper portion 125. In some embodiments, the taper portion 125 can have a length that is less than, equal to, or greater than the length of the cuff portion 115 or twice the length of the cuff portion 115.

Similarly, in some embodiments, the tubing portions 130 can comprise corrugations 131. However, in further embodiments, the corrugations 131 can be absent from the tubing portions (e.g., as illustrated in FIG. 2a). Non-corrugated portions 120 can be rigid in various embodiments.

In one embodiment, the liner 100 can be generated via extrusion molding systems or the like, which can comprise rotating dies that are configured to rotate in concert such that corresponding dies mate about an extruded tube generated by an extruder. Corresponding mated dies can thereby define one or more of the connector portion 110, taper portion 125 and/or the tubing portion 130.

In various embodiments, a vacuum can pull the material of an extruded tube to conform to negative contours defined by the mated die. In some embodiments, positive pressure can be introduced within the tube to conform to negative contours defined by the mated die. In various embodiments, such a manufacturing process can be beneficial because liners 100 can be made seamlessly, with no welds, and using a single material.

In some embodiments, liners 100 having varying lengths of the connector portion 110, taper portion 125 and/or the tubing portion 130 can be made by selectively choosing the order of dies such that desired portions are made longer or shorter. For example, in some embodiments, a liner 100 can be produced that fits into an irregular or non-rectangular cavity, which can require a liner 100 to have tubing portions 130 of variable lengths.

In some embodiments, a liner 100 can be made by forming various pieces of the liner 100 and then coupling the pieces together. For example, connector portion 110 can be manufactured separately from the taper portion 125 and/or the tubing portion 130, and/or the cuff portion 115. Such separate portions can be subsequently coupled together to form the liner 100.

A liner 100 can comprise various suitable materials including plastic, metal, or the like. In some preferred embodiments, a liner 100 can comprise Ultramid PA6, Rilsamid PA12, Lupolen HDPE, or the like.

Accordingly, the embodiments of a liner 100 shown and described herein should not be construed to be limiting on the wide variety of liners 100 that are within the scope and spirit of the present invention. For example, liners 100 as described in U.S. Provisional Patent Application No. 62/175,914, which is incorporated herein by reference, illustrate some further example embodiments of liners 100.

In some embodiments, a liner 100 can be a naked liner 100A as illustrated in FIGS. 1a-d, and 2a. However, as illustrated in FIG. 2b, in some embodiments a liner 100 can be a covered or over-braided liner 100B, which can include a braiding 200 or other suitable covering. An over-braided liner 110B can be desirable because the braiding 200 can increase the strength of the liner and thereby increase the duty pressure under which the liner 100 may safely operate. Additionally, braiding 200 can be disposed in a plurality of layers in various embodiments. For example, in one preferred embodiment, the braid 200 can comprise six layers of 48 carrier carbon braid 200.

As discussed in detail herein, the material(s), shape, size, configuration and other variables related to a braid 200 can be chosen to increase the strength provided by the braiding 200, increase the flexibility of the braiding 200, increase the strength to weight ratio of the braiding, and the like. In various preferred embodiments, braiding 200 can be configured to completely cover a liner 100. In other words, one or more layers of braiding 200 can be configured to cover the liner 100 such that the liner is not visible through the braid 200 once applied to the liner 100 and such that gaps between the braid are not present such that the liner 100 is visible through the braid 200.

Figure 4:
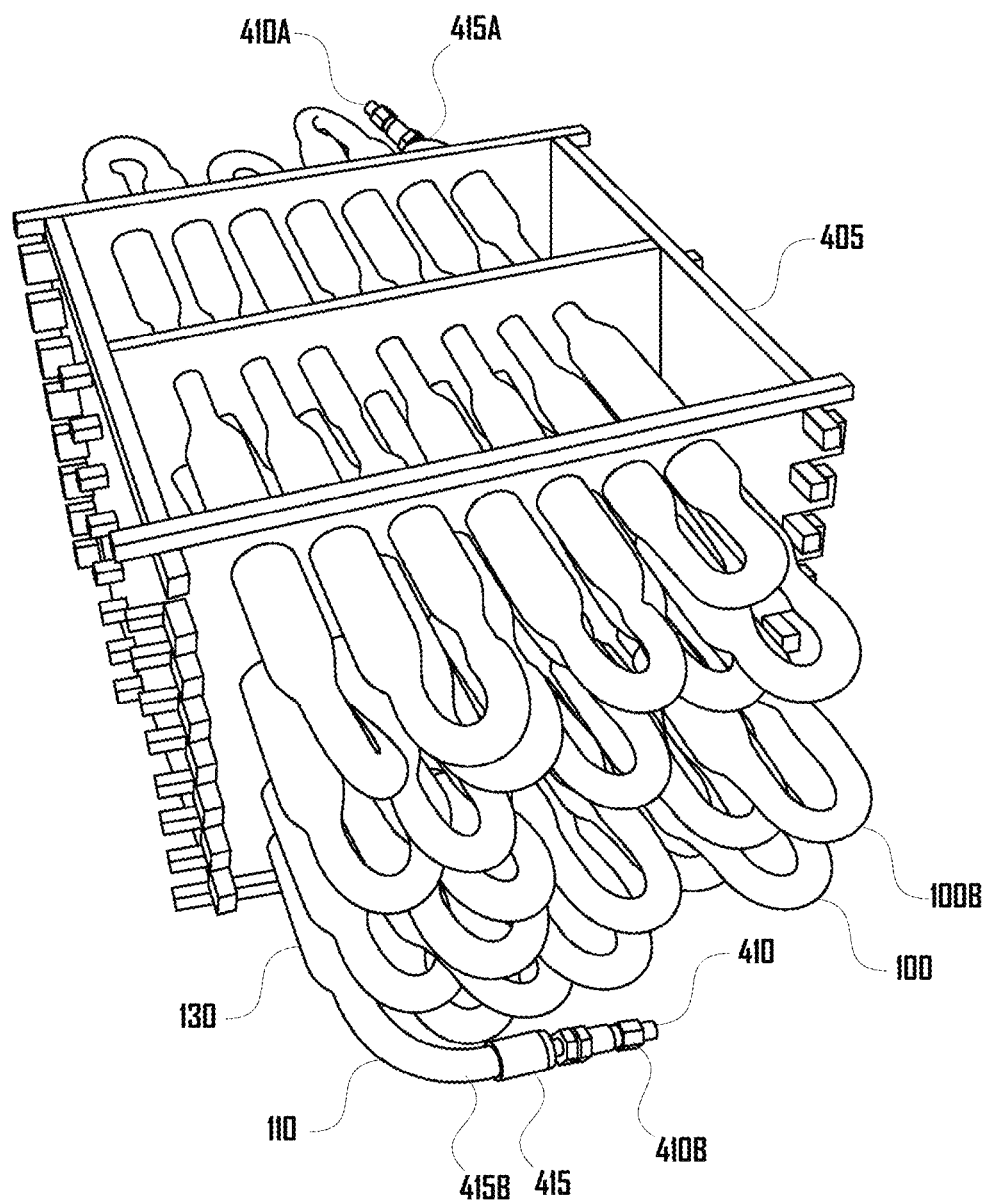
FIG. 4 illustrates one embodiment of a tank that is folded and held in a stacking architecture defined by a plurality of transverse planks that engage with a plurality of lateral planks.

In various embodiments, the tank 100 can be folded into a three-dimensional structure. For example, FIG. 4 illustrates one embodiment where an over-braided liner 100B is folded and held in a stacking architecture 405. The tank 100 can also include fittings 410 disposed at ends 415 of the tank 100. More specifically, a first fitting 410A can be coupled at a first end 415A of the tank 100 and a second fitting 410B can be coupled at a second end 415B of the fitting. Although FIG. 4 illustrates fittings 410 coupled to the connector portion 110 of the tank 100, in further embodiments, fittings can be coupled at any suitable portion of the tank 100, including the cuff portions 115, taper portions 125 and/or tubing portions 130. Such fittings 410 can include crimp fittings, bolt fittings, or any other suitable type of fitting. Examples of fittings in accordance with some embodiments are shown and described in U.S. patent application Ser. No. 15/792,090 entitled FITTINGS FOR COMPRESSED GAS STORAGE VESSELS, filed Oct. 24, 2017, which as discussed above is incorporated herein by reference in its entirety for all purposes.

In various embodiments, such fittings 410 can be configured to interface with a tank valve and have a hollow center bore that is not only large enough to allow the passage of a fluid but also large enough to allow the pass-through of valve instrumentation, or the like. For example, in various embodiments, such tank valves can be instrumented to detect tank conditions within the tank 100, including temperature, pressure, or the like, as described in more detail herein.

In some embodiments, a tank 100 can comprise smooth cuffs 115 at one or both ends 415 of the tank 100 for fitting attachment (e.g., as illustrated in FIGS. 2a and 3, but with the corrugated portion 105 removed). In some examples, connector portions 110 can comprise cuff sections 115 and corrugation sections 105 to allow for a smooth attachment surface for crimp fittings 410. However, in further embodiments, with modification to tooling mold blocks or the like, it is possible to incorporate cuff sections 115 to the end sections 415 of the tank 100, leaving internal connector portions 110 completely corrugated. Such cuff sections 115 at ends 415 of the tank 100 can be various suitable diameters, which can be the same size as, larger than, or smaller than internal connector portions 110, and such connector portions 110 can be completely or partially corrugated. In other words, some embodiments can include repeating tank geometries for internal portions of the tank 100 between the ends 415, with a different tank geometry on the ends 415 of the tank 100. Non-periodic tank geometries can be generated in various suitable ways including a liner forming machine with swappable mold blocks as discussed herein, or the like.

Figure 5:
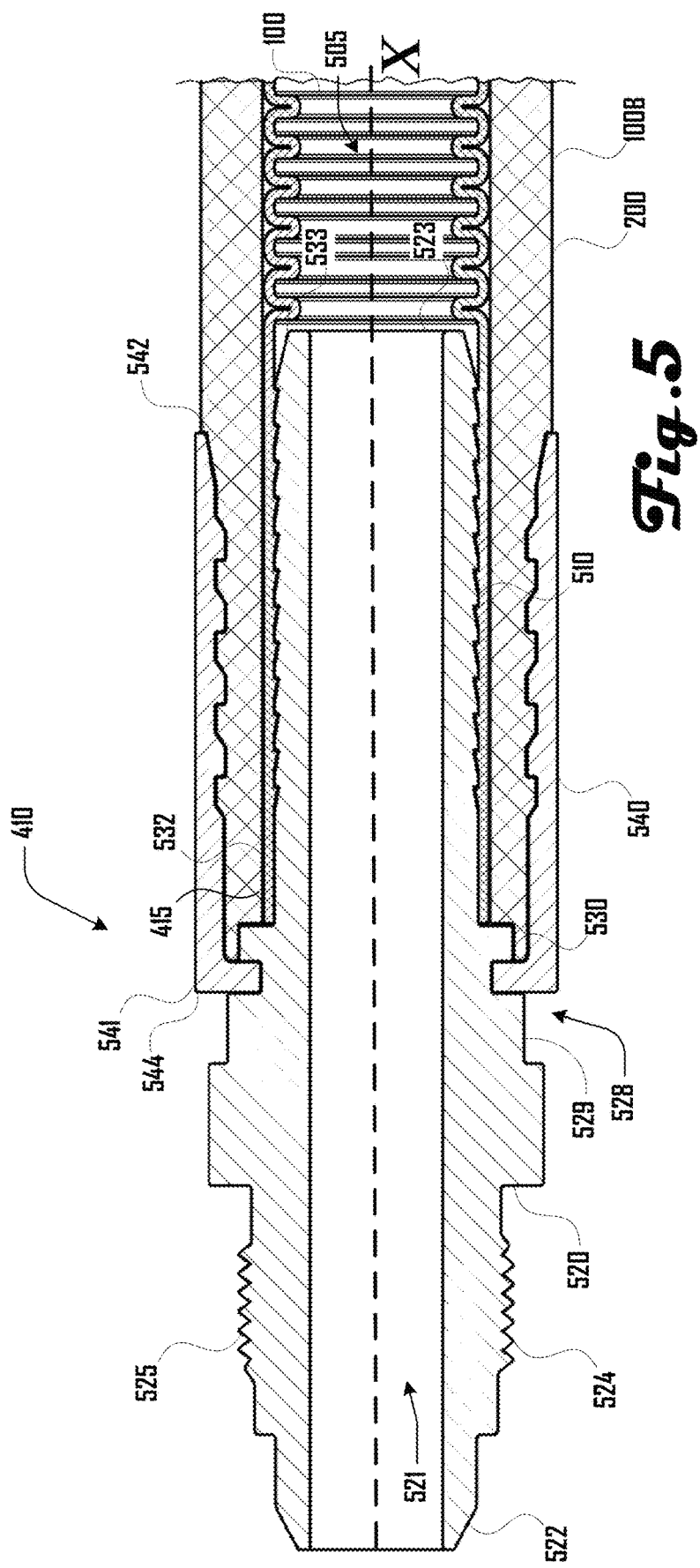
FIG. 5 illustrates a cutaway side view of a set of fittings coupled to an end of a tank.

Turning to FIG. 5, fittings 410 can be configured to couple with ends 415 of a liner 100. In some embodiments, fittings 410 can be configured to couple with an over-braided liner 100B that includes a liner 100, which is surrounded by one or more layer of braiding 200 as illustrated in FIG. 5. For example, fittings 410 can comprise a stem 520 and a ferrule 540, which are configured to couple with an end 415 of a liner 100 that is surrounded by one or more layer of braiding 200 as described in detail herein.

Fittings 410 can be made of various suitable materials including metal, plastic, or the like. In some embodiments, fittings 410 can be configured to be in contact with compressed hydrogen and can be configured to be resistant to hydrogen embrittlement or weakening of the fittings 410 and fracturing resulting from hydrogen diffusion into the fittings 410. For example, the fittings 410 can comprise a material and/or surface coating that is resistant to hydrogen induced fracturing.

The stem 520 can define a bore 521 that extends through the stem 520 along an axis X between a first and second end 522, 523. In some embodiments having a larger diameter bore 521 can be desirable to increase the flow rate through the bore 521, which can be desirable for faster filling.

Additionally, a larger diameter bore 521 can be desirable for allowing sensors to be inserted into the bore 521 and into the interior cavity 505 defined by the liner 100.

The stem 520 can comprise a head 524 that includes threads 525, which can be configured to couple with various systems such that suitable fluids can be introduced to and/or removed from an interior cavity 505 defined by the liner 100 as described in more detail herein. For example, where such a fluid comprises hydrogen, the head 524 can be directly or indirectly coupled with a hydrogen filling station to fill the interior cavity 505 defined by the liner 100 with hydrogen and can be directly or indirectly coupled with a vehicle engine to provide hydrogen fuel to the vehicle engine from hydrogen stored within the interior cavity 505 defined by the liner 100.

The head 524 can also connect to various other suitable components including a valve, pressure regulator, thermally activated pressure relief device, temperature sensor, pressure sensor, or the like. While various example embodiments discussed herein relate to a male conical shape of a head 524 that can be configured to seal against a corresponding female cone, further coupling or mating structures of various configurations can be implemented in further embodiments. For example, in one embodiment, the head 524 can comprise an O-ring face-seal, an O-ring bore-seal, or the like.

Additionally, various components can be configured to extend into a fitting 410 or into the cavity 506 defined by the over-braided liner 100B. For example such components can include at least a portion of a gas injector, a gas receiver (e.g., including a filter and an excess flow valve), a temperature sensor, a pressure sensor, a bleed valve, a temperature pressure relief device (TPRD), and the like. In some embodiments such components can be inserted into and reside within the bore 521 of the stem 520 and/or within the cavity 505 defined by the liner. In various embodiments, it can be desirable to have a large diameter bore 521 to accommodate such components.

The head 524 can extend to a coupling architecture 528 defined by a first and second rim 529, 530 disposed on opposite sides of and defining a coupling groove 531. A coupling body 532 can extend from the coupling architecture 528 and terminate at the tip 533 disposed at the second end 523 of the stem 520.

The ferrule 540 can comprise a cylindrical body having a first and second end 541, 542 with a lip 544 defining a coupling orifice at the first end 541. The ferrule 540 can further define a cavity that extends between the first and second end 541, 542 and opens to the coupling orifice at the first end 541 and an opening at the second end 542.

In various embodiments, the stem 520 and ferrule 540 can couple about an end 415 of an over-braided liner 100B in various suitable ways such that a fluid-tight seal is generated by the resulting fitting 410. Such a coupling can be configured or rated for use with pressurized fluids including being rated for use at 10 MPa, 25 MPa, 50 MPa, 70 MPa, 90 MPa, 110 MPa, 130 MPa, 150 MPa, or the like. In one preferred embodiment, a fitting 410 comprising a stem 520 and ferrule 540 as described herein can be rated for use with pressurized hydrogen at 70 MPa nominal working pressure. In another preferred embodiment, a fitting 510 comprising a stem 520 and ferrule 540 as described herein can be rated for use with compressed natural gas (CNG) at 25 MPa nominal working pressure. Although various embodiments discussed herein can be configured for use with fuel fluids such as hydrogen or CNG, further embodiments can be configured for use with any suitable fluid at various suitable pressures. Additionally, some embodiments can be configured for use with cryogenic fluids, room-temperature fluids, or heated fluids.

Figure 6:
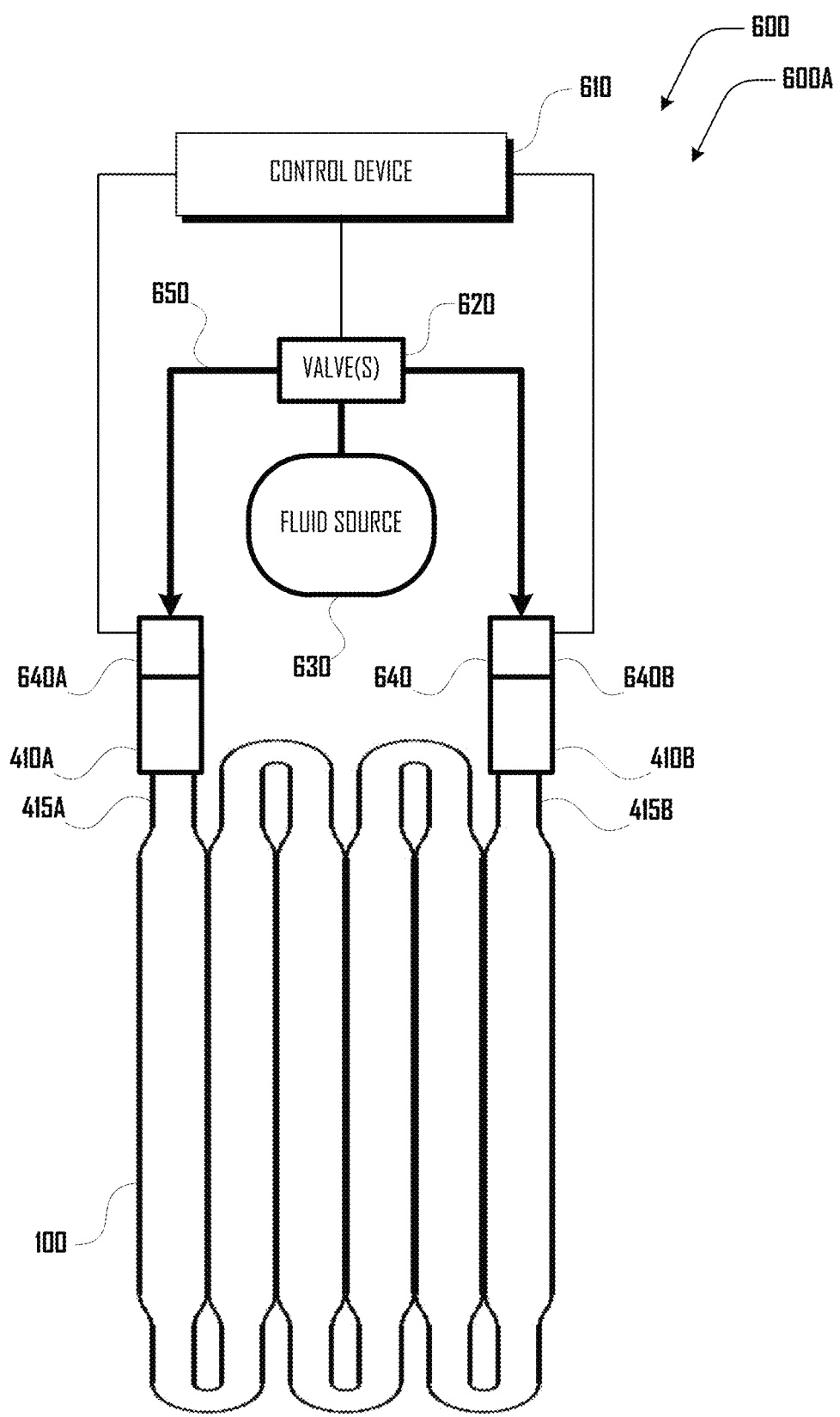
FIG. 6 is a diagram of a tank filling system in accordance with an embodiment.

Turning to FIG. 6, a tank filling system 600 of one embodiment 600A is illustrated that comprises a control device 610 that drives a valve assembly 620 to direct fluid from a fluid source 630 to filling couplers 640 via fluid lines 650. The filling couplers 640 are removably coupled to fittings 410 on ends 415 of a tank 100. More specifically, a first filling coupler 640A is removably coupled to a first fitting 410A at a first end 415A of the tank 100, and a second filling coupler 640B is removably coupled to a second fitting 410B at a second end 415B of the tank. The control device can be operably connected to the filling couplers 640 as described in more detail below.

The filling couplers 640 can be removably coupled to the fittings 410 in various suitable ways. For example, referring to the example fittings 410 of FIG. 5, filling couplers 640 can couple with the threads 525 on the head 524 of the stem 520, which can provide a fluid-tight seal between the filling coupler 640 and the fittings 410. Additionally, in various embodiments, the filling couplers 640 can comprise one or more sensors, which can include a temperature sensor, pressure sensor, velocity sensor, and the like. When a filling coupler 640 is coupled with a fitting 410, such sensors can be disposed within the body of the filling coupler 640, and can extend into and be disposed within the fittings 410 (e.g., within the bore 521) or within a portion of the tank 100 (e.g., the cavity 505).

The control device can comprise any suitable computing system or computing device, which can receive data from one or more sensors associated with the fitting couplers 640, tank 100 or the like, via wired and/or wireless communication. The control device 610 can control the one or move valves 620 to control flow of fluid from the fluid source 630 to the ends 415 of the tank 100 via the fluid lines 650. Although one example configuration of valves 620 is illustrated in FIG. 6, it should be clear that any suitable configuration of one or more valves, or the like, is within the scope and spirit of the present disclosure, and the example configuration of FIG. 6 should not be construed to be limiting. For example, the illustration of FIG. 6 should not be construed to exclude configuration having valves collocated at the fluid source 630, fitting couplers 640, or the like.

Pressurized gaseous fuel tanks can experience heating when filled due to heat of compression and, for some gasses, to the Joule-Thompson effect. For safety, some compressed fuel filling stations control the filling rate to avoid dangerously high temperatures. In addition, the high temperatures can be undesirable because they can result in low density at a given pressure, thus requiring overpressure to reach the target density (state of charge near 100%) or under-filled tanks.

Such heat generation can therefore result in undesirably long filling times that take longer than filling gasoline or diesel fuel tanks and/or under-filled tanks. To mitigate these issues associated with gaseous fuel tanks, many stations have the option of gas pre-cooling. With gas pre-cooling, the gas is cooled to a low temperature (e.g., as low −40° C.) before the gas enters the tank. This has the effect of lowering the maximum temperature that the gas reaches due to heat of compression, since the initial temperature is lower.

Gas pre-cooling can add significant additional complexity to the construction of fueling stations, which can undesirably increase capital cost and operational cost for the fueling station. This increased cost may be transferred to the customer in the form of higher gas prices. In addition, pre-cooling components can have poor reliability in some examples, resulting in significant station downtime and additional cost due to maintenance and replacement parts.

Novel conformable tanks discussed herein and in related applications (e.g., U.S. Ser. No. 13/887,201; U.S. Ser. No. 14/172,831; U.S. Ser. No. 14/624,370; U.S. Ser. No. 15/183,614; and U.S. Ser. No. 15/368,182, which are hereby incorporated herein by reference) can be advantageous over conventional monolithic compressed gas tanks because the conformable shapes can have more surface area per unit volume of storage. Such increased surface area can allow for more rapid heat dissipation, which can increase fast-fill performance. In addition, such conformable tanks can have a smaller cross-sectional area, which can result in higher flow velocity during filling and hence better convective heat transfer from the gas to the tank wall (i.e., higher Nusselt number).

During filling or fast-fill, such novel pressure vessels can reach a lower average temperature than conventional pressure vessels. This can be because such novel pressure vessels have a higher ratio of surface area to volume, and because the gas can have a higher average speed due to the smaller tank diameter, resulting in greater convective heat transfer. This can result in a reduced need for gas pre-cooling. Conformable pressure vessels can thus be filled with fluid that is precooled to a higher temperature or not precooled at all, while still achieving the filling speeds that are normally associated with pre-cooled gas.

However, in some embodiments, less mixing can occur during the filling of various example tanks 100 or pressure vessels due to their elongated shape, meaning that the difference between maximum and minimum temperature at the end of a filling can be much more extreme than for other configurations of pressure vessels. In particular, the gas temperature near the ends 415 can remain close to the temperature of the inflowing gas, since the flow speed at the ends 415 can result in good heat transfer to the walls. The chambers of the tank 100 that are far from the ends 415, on the other hand, can heat up considerably because there is little flow in the far region of the tank 100 and hence have poor convective heat transfer.

Such a temperature rise at one end 415 of the tank 100 in such embodiments can be mitigated by filling from alternating ends 415A, 415B of the tank 100. For example, at the start of fill, the tank 100 can be filled from the first end 415A, and the temperature at the second end 415B can rise. When the temperature at the second end 415B reaches a defined high value, the inlet to the first end 415A can be closed, and the inlet to the second end 415B can be opened. Thus, in various embodiments, the end 415 that is hottest can be given a high flow velocity and can dump heat to the walls of the tank 100. This pattern can be repeated until the tank 100 is filled. The frequency of flow switching can be chosen so that the fluid temperature of the tank 100 stays below a target maximum temperature.

Figure 7:
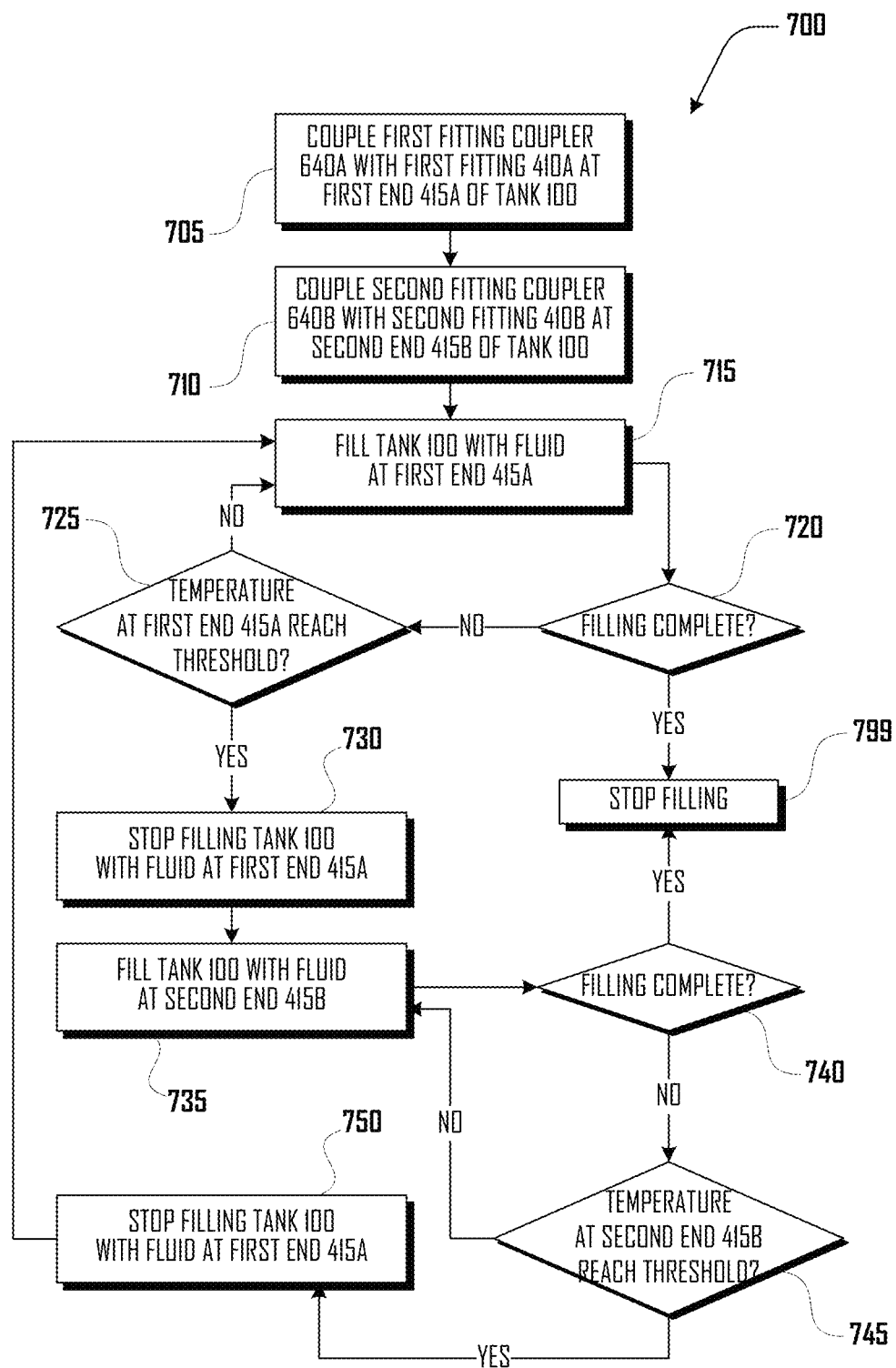
FIG. 7 is a block diagram of a method of filling a tank with fluid in accordance with one embodiment.
Figure 10:
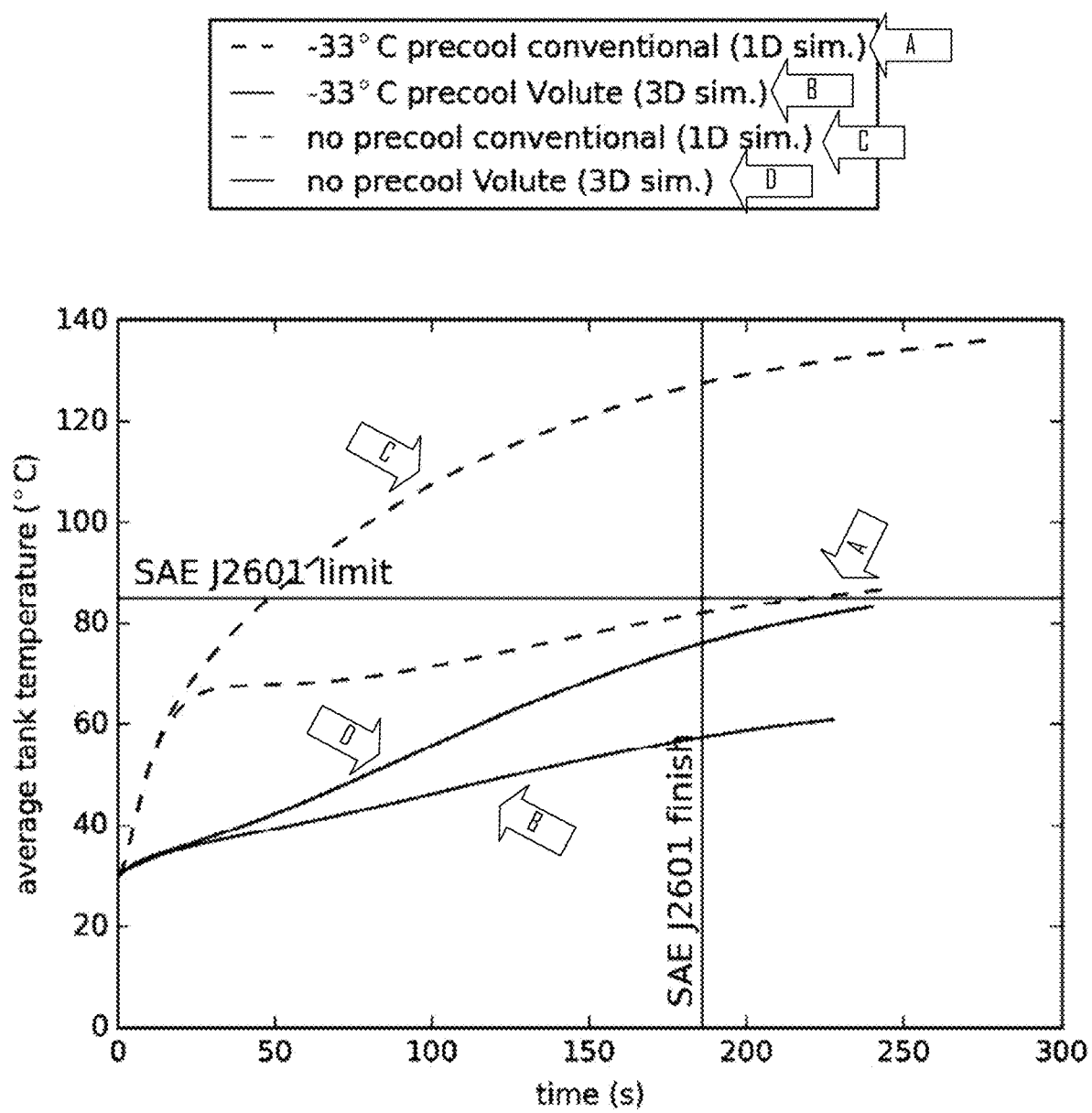
FIG. 10 is a plot of average tank temperature over time for the simulations.
Figure 12:
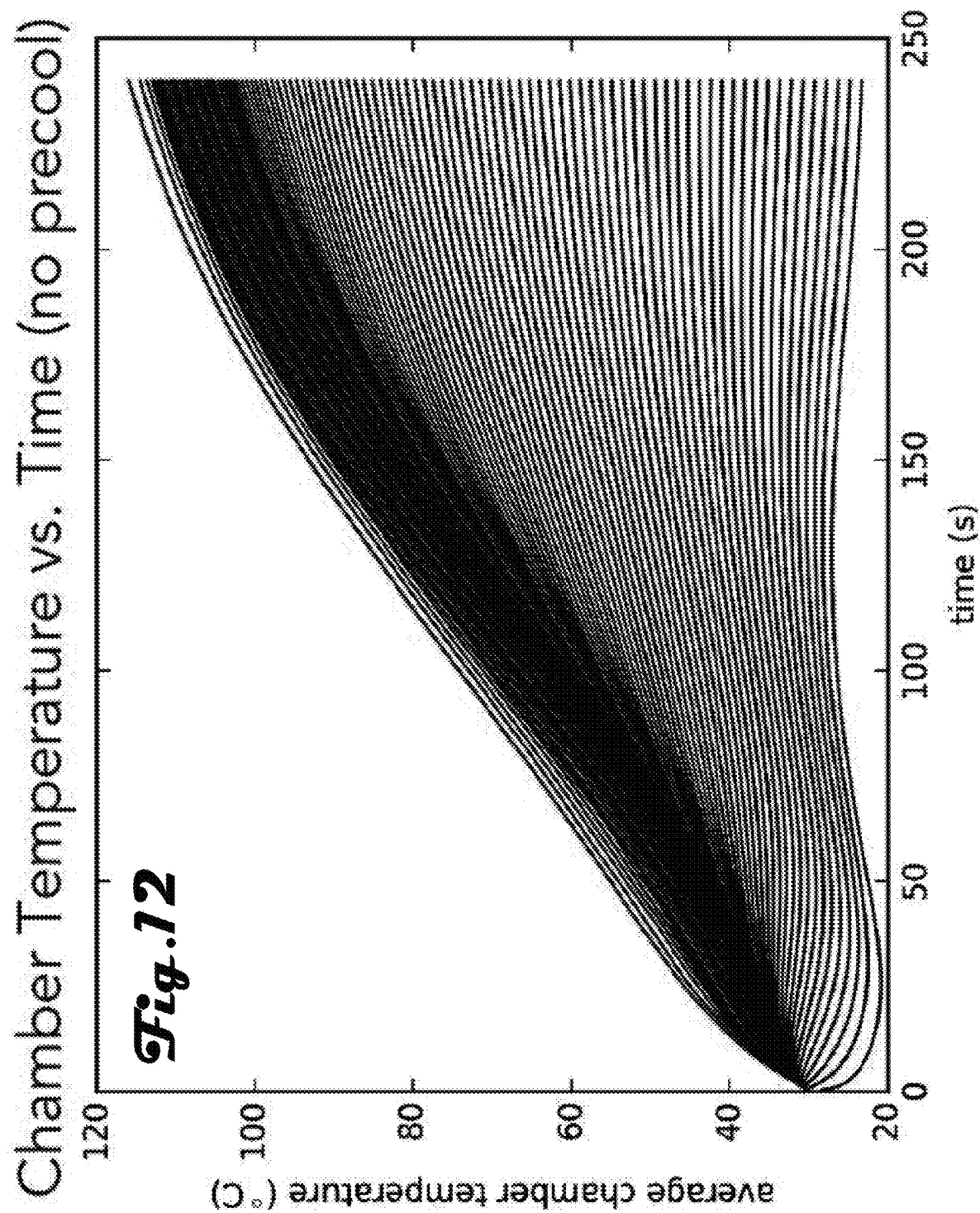
FIG. 12 is a plot of average chamber temperature over time with no precool.
Figure 13:
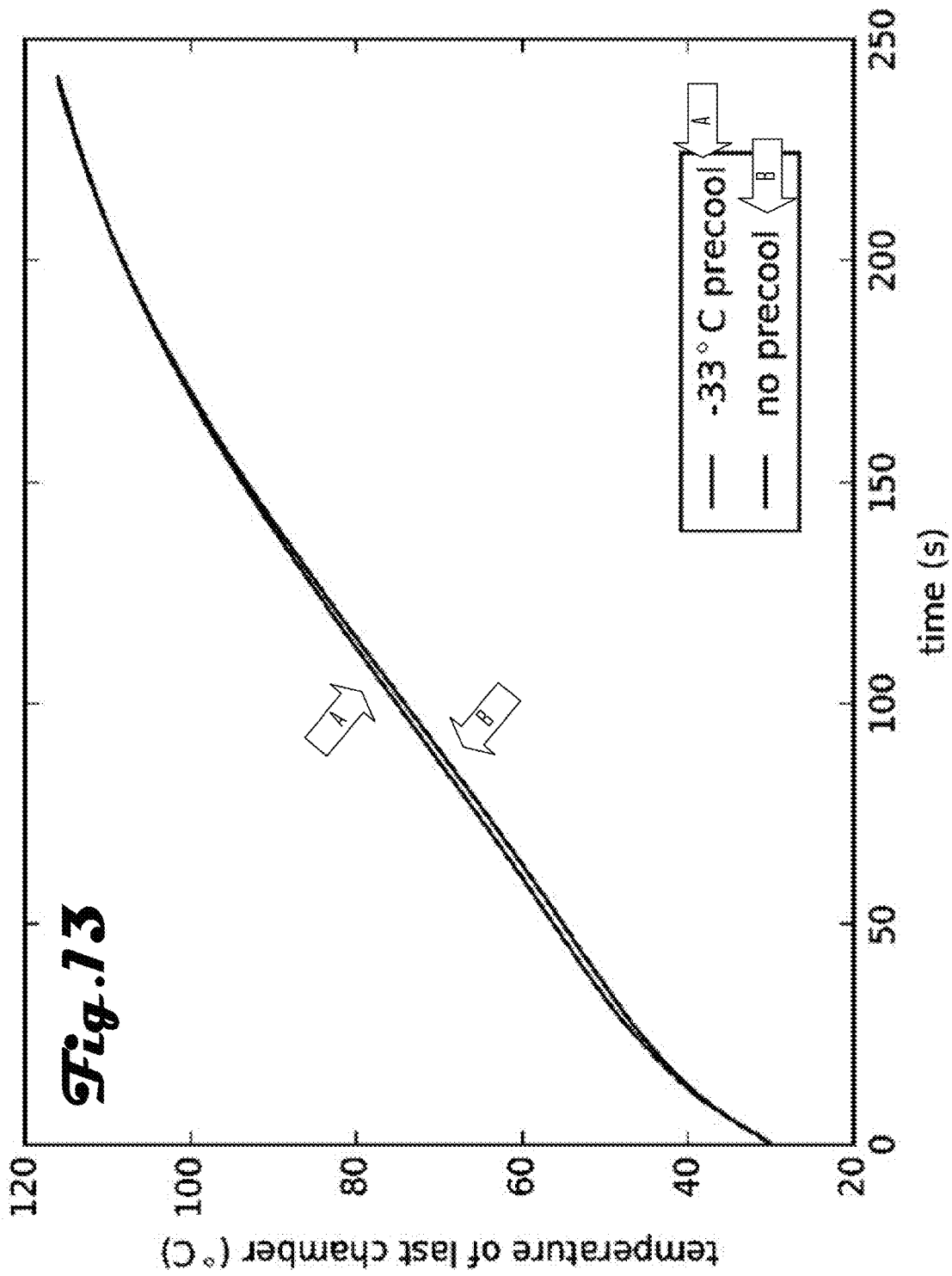
FIG. 13 is a plot of last chamber temperature over time.

Turning to FIG. 7, a block diagram of method 700 of filling a tank 100 with fluid in accordance with one embodiment is illustrated. The method 700 begins at 705, where a first fitting coupler 640A is coupled with a first fitting 410A at a first end 415A of a tank 100 (e.g., see FIG. 6). At 710, a second fitting coupler 640B is coupled with a second fitting 410B at a second end 415B of the tank 100.

The method 700 continues to 715, where filling of the tank 100 with fluid at the first end 415A is initiated. For example, referring to the example tank filling system 600 of FIG. 6, the tank 100 can be filled with fluid from the fluid source 630 by the control device 610 actuating one or more of the valves 620 such that fluid from the fluid source 630 travels via a fluid line 650 to the first fitting coupler 640A, where the fluid enters the first fitting 410A and enters the first end 415A of the tank 100. In some examples, filling can be initiated by a user actuating a button associated with the tank filling system 600 and the control device 610 can confirm suitable coupling between the fitting couplers 640 and fittings 410 before initiating filling at the first end 415A.

Returning to the method 700, at 720 a determination is made whether filling is complete. For example, in various embodiments a fill status of the tank 100 can be determined based at least in part on data from one or more sensors associated with the tank 100 and/or fitting couplers 640. In one example, one or both of the fitting couplers 640 can include a pressure sensor that determines a pressure of fluid within the tank 100, which can be used to determine a fill state of the tank 100. In other words, one or more pressure sensors can be used to determine whether the tank 100 is full or at a filling threshold based at least in part on a determined pressure of the tank 100.

If at 720 filling is not complete, then the method 700 continues to 725, where a determination is made whether a temperature of the first end 415A of the tank 100 has reached a threshold. For example, in various embodiments, the first fitting coupler 640A can comprise a temperature sensor that can sense a temperature at the first end 415A of the tank 100. Temperature thresholds can be any suitable temperature threshold, including a maximum temperature threshold of 85° C. However, in further embodiments, such a maximum threshold can include 60° C., 70° C., 80° C., 90° C., 100° C., and the like.

If at 725 a temperature at the first end 415A has not reached the temperature threshold, then the method 700 cycles back to 715, where filling of the tank 100 at the first end 415A continues. However, if a temperature at the first end 415A has reached the temperature threshold, then at 730, filling of the tank 100 at the first end 415A is stopped, and at 735, filling of the tank 100 at the second end is initiated. For example, the control device 610 can receive temperature readings from one or more temperature sensors associated with the first fitting coupler 640A and determine whether the temperature at the first end 415A has reached the temperature threshold. The control device 610 can control the one or more valves 620 to maintain filling at the first end 415A or to stop filling at the first end 415A and begin filling at the second end 415B.

Returning to the method 700, at 740, a determination is made whether filling is complete, and if not, the method 700 continues to 745 where a determination is made whether a temperature at the second end 415B has reached a temperature threshold. If not, the method 700 cycles back to 735, where filling at the second end 415B is maintained. However, where it is determined that a temperature at the second end 415B has reached a temperature threshold, then the method 700 continues to 750, where filling at the second end is stopped, and then at 715, filling of the tank 100 at the first end is initiated.

As shown in the example method of FIG. 7, filling can alternate between the first and second ends 415A, 415B until it is determined that filling is complete at 720 or 740. For example, where the control device 610 obtains data from one or more sensors associated with the tank 100, filling couplers 640, or the like, that indicates that the tank 100 is full or at a filling threshold, then filling at the first and/or second ends 415A, 415B can be terminated to stop filling at 799. The first and second filling couplers 640A, 640B can then be removed from the first and second fittings 410A, 410B at the first and second ends 415A, 415B of the tank 100.

In various examples, any of the steps or operations of the method 700 of FIG. 7 can be performed automatically and without human intervention. For example, the control device 610 can, beginning at 715, initiate filling of the tank 100; determine whether filling of the tank is complete, switch filling between ends 415; maintain filling at an end 415; determine whether a temperature at the ends 415 has reached or exceeded a temperature threshold; and stop a filling session at 799. In further examples, coupling and/or de-coupling of the filling couplers 640A, 640B can also be automated, including via an automated docking station, robotic arm(s), and the like.

A simulation study was performed comparing one example of a tank 100B as shown in FIG. 8 to a conventional tank having the parameters illustrated in FIG. 9a. A 3D simulation for the example tank 100B (5 kg having one hundred and twelve tubing portion chambers 130) was performed for the four cases illustrated in FIG. 9b, and a 1D simulation was performed for the conventional tank for the same four cases illustrated in FIG. 9b.

Each of the test cases included:
20° C. ambient temperature, 30° C. "hot soak"
0.5 MPa initial pressure
21.8 MPa/min., as per SAE J2601
H70-T40 (−33° C. pre-cool)
Fill time of 3.1 minutes to 67.9 MPa NOTE: In some embodiments, no standard exists for 0° C. pre-cool or no pre-cool, but the 70-T20 specification allows for −17.5° C. pre-cool. This can require 6.7 MPa/min. for a 9.9 minute fill.

Plots of various results are illustrated in FIGS. 10-13.

The results can illustrate the following for various embodiments of the novel tank 100 compared to conventional tanks:

Increased surface area and flow velocity of novel tanks 100 can allow for better heat transfer in various embodiments. Accordingly, pre-cool can be unnecessary in such embodiments of tanks 100. In some embodiments, it can be desirable for materials to be designed for working temperature of 120° C. However, if 120° C. working temperature is not possible, filling from alternating ends can keep maximum temperature well below 85° C., in accordance with some embodiments. More specifically, the 3D results show maximum temperatures at the last chamber of 120° C. and 116° C., respectively. These temperatures are higher than a limit of 85° C., but that limit applies only to the average temperature of the pressure vessel as a whole.

Additionally, the following was observed during these tests:

Flow rate is <3 g/s for 10-chamber tanks. For a 4.5 kg tank, required flow rate is ~30 g/s for a 3-minute fill. Highest temperature is at the far end of the tank, where gas is the most stagnant and, therefore, has the lowest heat transfer coefficient for transferring heat to the walls. For some tank sizes, peak temperature goes down as number of chambers goes up—this can be because the flow rate goes up, so more heat is transferred to walls as gas is flowing. Initial gas in the tanks can be the gas that hits peak temperatures, since this gas is not pre-cooled and has a low thermal mass due to low initial density. Tank pressure can be nearly uniform throughout tank during fill—this surprising result indicates that the flow resistance caused by the bends can be negligible.

In some examples, a challenge with tanks 100 is how to estimate the state of charge (SOC) of a tank 100 during filling, if the difference in temperature from between the first and second ends 415A, 415B is extreme. The average density must be determined in some examples in order to know the SOC, and to estimate the average density, two thermodynamic state variables can be required: the average pressure and the average temperature. The simulations show very little deviation in pressure along the length of the tank 100, so the average temperature is the only unknown in various examples.

In some embodiments it is possible to estimate density using temperature at the non-filling end. Density can have a weak dependence on temperature in the relevant range of temperatures. Therefore, the temperature at the non-filling end of the tank can be used as a replacement for the average temperature when estimating the average density. For example, a filling simulation with no precool ends when $P_{avg}$=85 MPa and $T_{avg}$=83° C., yielding an average final density of $\rho_{avg}$=39.6 g/L. If instead the temperature of the last chamber $T_{last}$=116° C. were used, it would result in an estimated final density of $\rho_{avg}$=37.2 g/L, which is only 6% off from the actual value. Note too that this can yield a conservative estimate, thereby ensuring that the tank 100 will not be over-pressurized.

Some embodiments can estimate density using flux of gas during filling. Before filling, the initial density, $\rho_{initial}$, can be estimated accurately in some examples since there may be minimal temperature variations within the tank 100. Given this value and the tank volume, V, the density can be estimated during filling by integrating the mass flux into the tank, $\dot{m}(t)$. In hydrogen filling stations, for example, it can be necessary in some embodiments to have an accurate estimate of the mass flux in order to charge the customer for fuel, so this information may already be available. The average density can then be given by the equation $$\rho_{avg}(t) = \rho_{initial} + \frac{\int_0^t \dot{m}(\tau)d\tau}{V}.$$

In another example, a fueling and defueling simulation of a 50-chamber, 10 kg tank 100 was conducted to measure state of charge (SOC) of the tank. In various examples, it can be desirable to measure the instantaneous (SOC) of a tank 100 during fueling and defueling of the tank 100 to within a certain accuracy, which entails measuring the average density to within a certain accuracy. In order to estimate the average density, and hence the SOC, the average pressure and average temperature in the tank 100 can be determined. In various examples, pressure deviations in the tank 100 can be considered minimal; therefore, it can be desirable to determine the average temperature.

In some examples, it can be challenging to determine the average temperature at the end of fueling for various reasons including temperature being least homogenous at the end of fueling. Additionally, pressure can be highest at the end of fueling, so incorrect temperature measurements can lead to a large absolute error in density measurement.

In some embodiments, sensors (e.g., thermocouples or the like) can be disposed at the first and second ends 415A, 415B of a tank 100 (e.g., associated with fitting couplers 640). Accordingly, in various examples, such sensors we can be used to determine the SOC in the first and last (i.e., $50^{th}$) chamber:

$SOC_1 = \rho(p,T_1)/\rho(70 \text{ MPa},15° \text{ C.})$ $SOC_{50} = \rho(p,T_{50})/\rho(70 \text{ MPa},15° \text{ C.})$ One way to determine the average SOC of the tank 100 includes averaging readings from sensors at the first and second ends 415A, 415B of a tank 100, $$SOC_{tank}=(SOC_1+SOC_{50})/2$$

However, in some examples, such a calculation may not produce an estimate that is accurate enough to meet a desired accuracy threshold. Since $SOC_{tank}$ can be closer in value to $SOC_{50}$ than to $SOC_1$, an alternative method of determining $SOC_{tank}$ can include taking a weighted average of the readings from sensors at the first and second ends 415A, 415B of a tank 100, so that $SOC_{50}$ is weighted higher than $SOC_1$, $$SOC_{tank}=(\alpha \cdot SOC_1+SOC_{50})/(1+\alpha).$$

In various examples, $\alpha<1$ can produce a desirable estimate of the $SOC_{tank}$, since $\alpha<1$ can result in a formula that weights the SOC of the chambers 130 at the terminal end 415B of the tank 100 more than the chambers 130 at the beginning end 415A.

During filling of an elongated and folded tank 100 with fluid, the fluid within the tank can exceed a maximum desired temperature limit locally, even if the average fluid temperature within the tank 100 stays below such a desired maximum temperature limit. This can be due to the fact that there is limited mixing in some embodiments of such tanks 100, where the fluid at a non-filling second end 415B of the tank 100 heats up due to having a low flow velocity (and hence low heat transfer) but is not able to mix with cool fluid near an inlet end 415A.

Various suitable temperature limits can be accommodated in accordance with embodiments discussed herein. For example, vessel regulatory standards (such as UN GTR 13, SAE J2579, SAE J2601) are written for a maximum gas temperature of 85° C. due to a maximum tank component temperature of 85° C. However, in further embodiments, a maximum gas temperature can include 60° C., 70° C., 80° C., 90° C., 100° C., and the like.

In some embodiments, filling the tank 100 from alternating ends as discussed herein can result in lower maximum (as well as average) temperatures, due to various effects. For example, when the filling end is switched, the hot stagnant fluid at the non-filling end 415 of the tank 100 can be given a high flow velocity by filling, allowing the fluid to dump heat to the walls of the tank 100. In another example, when the filling end is switched, the cold incoming fluid can mix with the hot fluid at the end that was formerly the outlet, helping to decrease the maximum temperature in that location.

Figure 14:
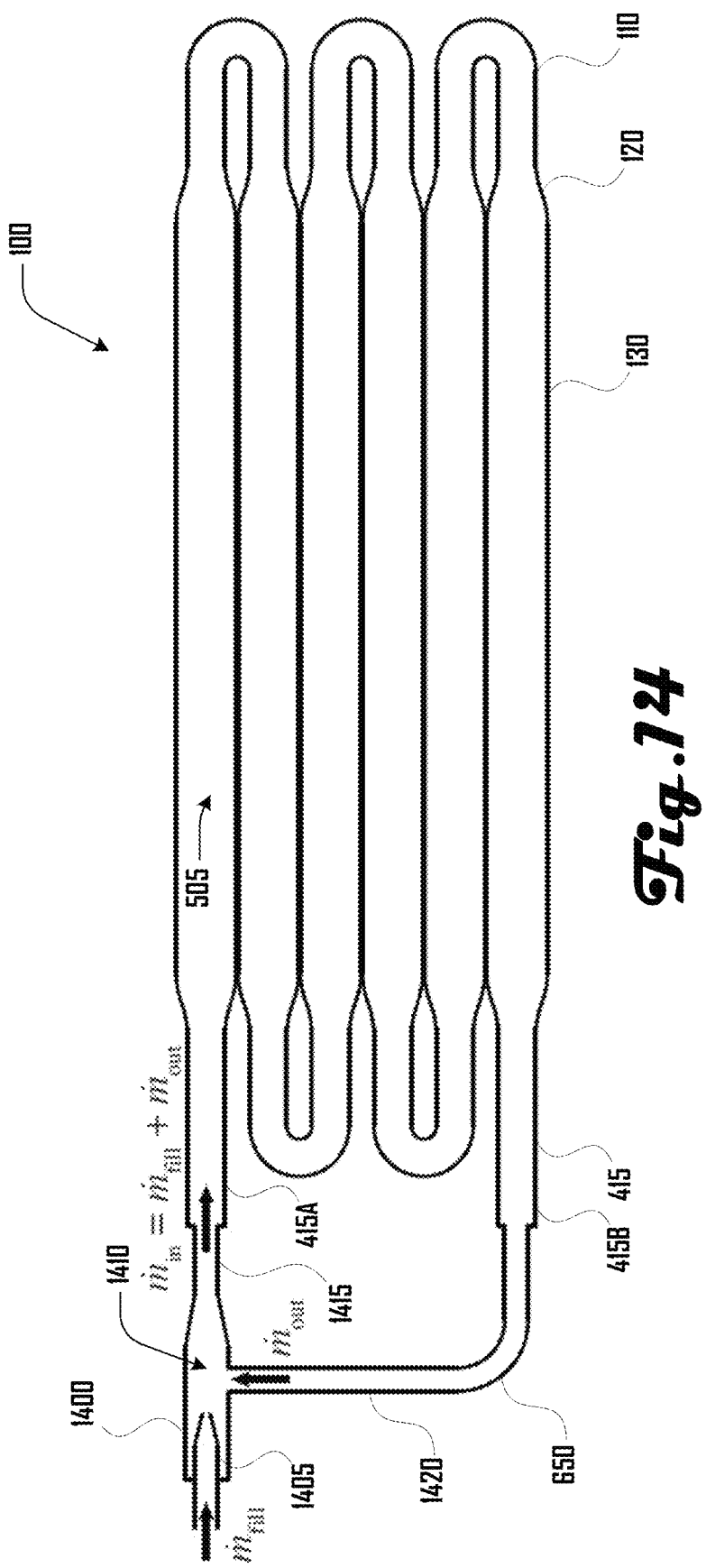
FIG. 14 is a schematic showing a Venturi assembly connected to a 6-chamber tank, circulating gas flow during the filling of an example 6-chamber tank with fluid.
Figure 15:
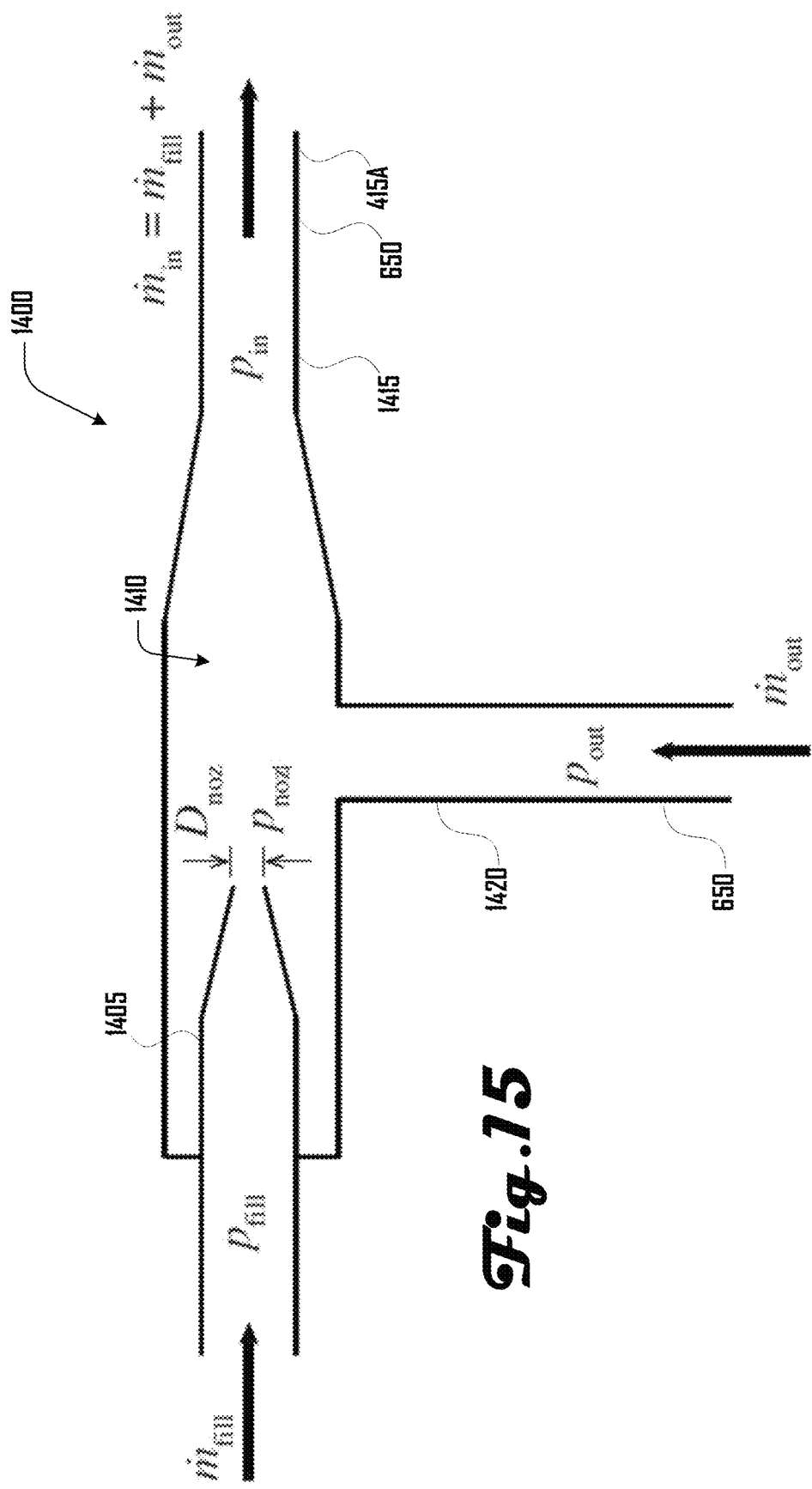
FIG. 15 is a schematic showing the Venturi assembly of FIG. 14 circulating the flow during the filling of a tank with fluid.

In further embodiments, a Venturi nozzle (also known as an eductor or an ejector) can be used to circulate fluid flow during the filling process, which can result in lower maximum (as well as average) temperatures of the fluid and/or tank 100 during filling. For example, FIG. 14 is a schematic showing a Venturi assembly 1400 circulating fluid flow during the filling of an example 6-chamber tank 100. FIG. 15 is a close up schematic showing the Venturi assembly 1400 circulating the flow during the filling of the tank 100.

The Venturi assembly 1400 is shown comprising a Venturi nozzle 1405 that introduces a flow of fluid to a Venturi chamber 1410. The mixing chamber of the Venturi 1410 is connected to an inlet 1415 that communicates with a first end 415A of the tank 100 and introduces fluid into the interior cavity 505 of the tank 100. An outlet 1420 is shown coupled at a second end 415B of the tank 100, with the outlet 1420 coupled with the Venturi chamber 1410 that introduces a flow of fluid into the Venturi chamber 1410 that originates from fluid leaving the second end 415B of the tank 100.

As shown in FIG. 15, fluid can enter the Venturi assembly 1400 via the Venturi nozzle 1405 at an inlet pressure $p_{fill}$ before accelerating through the nozzle 1405 with diameter $D_{noz}$, where the pressure drops to $p_{noz}$ due to the increased speed of the flow. The low pressure draws in the fluid from the outlet 1420 of the tank 100, which enters the Venturi chamber 1410 at a pressure $p_{out}$. The two fluid streams from the nozzle 1405 and outlet 1420 can mix in the Venturi chamber 1410 and then exit the Venturi chamber 1410 via the inlet 1415 to enter the first end of the tank 100, at a pressure $p_{in}$. In some embodiments, the Venturi assembly 1400 and tank 100 can be configured to operate with a maximum mass flow rate $\dot{m}_{fill}$ of 60 g/s. In further embodiments, it can be desirable for a tank 100 and Venturi assembly 1400 be configured for, and to be filled at, a maximum pressure ramp rate of less than or equal to 28.5 MPa/min.

Use of a Venturi assembly 1400 can decrease the maximum temperature during filling in various ways. In one example, the flow at the second end 415B of the tank 100, rather than being stagnant, can have a mass flow rate $\dot{m}_{out}$, which can enable better heat transfer from the hot fluid to the walls of the tank 100. In another example, there can be less temperature variation overall throughout the tank 100, since the hot fluid at the second end 415B of the tank 100 can be removed from the tank 100 via $\dot{m}_{out}$, and mixed with the cold filling gas, $\dot{m}_{fill}$. Then, the hot gas at the second end 415B of the tank 100 can be replaced with cooler gas that is flowing from the inlet of the tank 1415.

In some embodiments, it can be desirable for the pumping pressure of the nozzle 1405 to be strong enough to generate a significant circulating mass flow, $\dot{m}_{out}$. In various examples, the amount of circulating flow, $\dot{m}_{out}$, can be determined by a balance between the dynamic pressure drop in the Venturi valve and the pressure drop through the tank 100 and connecting tubing 650. In further examples, for a fixed Venturi nozzle geometry, the circulating mass flow rate, $\dot{m}_{out}$, can be approximately proportional to the filling mass flow rate, $\dot{m}_{fill}$, and not dependent on the instantaneous pressure, density, or temperature. In other words, $\phi=\dot{m}_{out}/\dot{m}_{fill}$ is only a function of geometry and flow resistance (which is itself a function of geometry) in various examples.

In some embodiments, a smaller Venturi nozzle diameter $D_{noz}$ can lead to a greater dynamic pressure drop and hence more circulation. However, the nozzle diameter $D_{noz}$ can be limited by choking concerns. If the nozzle diameter $D_{noz}$ is too small in some embodiments, the nozzle 1405 will choke, restricting flow into the tank 100. This can cause the tank 100 to fill slower at low pressures and to speed up in filling rate once the tank 100 fills enough to eliminate the choking condition. Then, the tank 100 may not reach a full state of charge at the end of filling. In some examples, it can be desirable to configure a Venturi assembly 1400 having a nozzle diameter $D_{noz}>16.5$ mm. In further examples, it can be desirable to configure a Venturi assembly 1400 having a minimum of 6 mm inner diameter for the Venturi nozzle 1405. In still further examples, it can be desirable to configure a Venturi assembly 1400 having a minimum of 2 mm, 3 mm, 4 mm, or 5 mm inner diameter for the Venturi nozzle 1405, or other suitable minimum diameter.

Additionally, it can be desirable to use a Venturi nozzle 1405 with a varying diameter, so that the nozzle diameter $D_{noz}$ can be decreased when choking is not a concern. For example, the nozzle diameter $D_{noz}$ can be decreased once the tank 100 reaches a high enough absolute pressure and/or at high ambient temperature when the filling rate is slower.

In some embodiments, the ratio φ can be increased by increasing the inner diameter of corrugations 111 of a tank 100 (see e.g., FIGS. 1, 2a and 3). In some examples, improved circulation can be obtained through increasing corrugation inner diameter while keeping the ratio of corrugation inner diameter to outer diameter constant, and while keeping the ratio of corrugation outer diameter to chamber outer diameter constant. In further examples, improved circulation can also be obtained through increased corrugation inner diameter while keeping corrugation outer diameter constant.

In some embodiments, it can be desirable for tubing 650 that connects the second end 415B of the tank 100 to the Venturi chamber 1410 to be as short and as wide as possible. In some examples, this can limit potential tank designs by requiring the two ends 415 of the tank 100 to be positioned near each other.

In further examples, the Venturi assembly 1400 can be placed directly at the first end 415A of the tank 100 in order to minimize losses and maximize circulation. In some examples, tubing 650 should only be used to connect the second end 415B of the tank 100 to the Venturi suction port.

Figure 16:
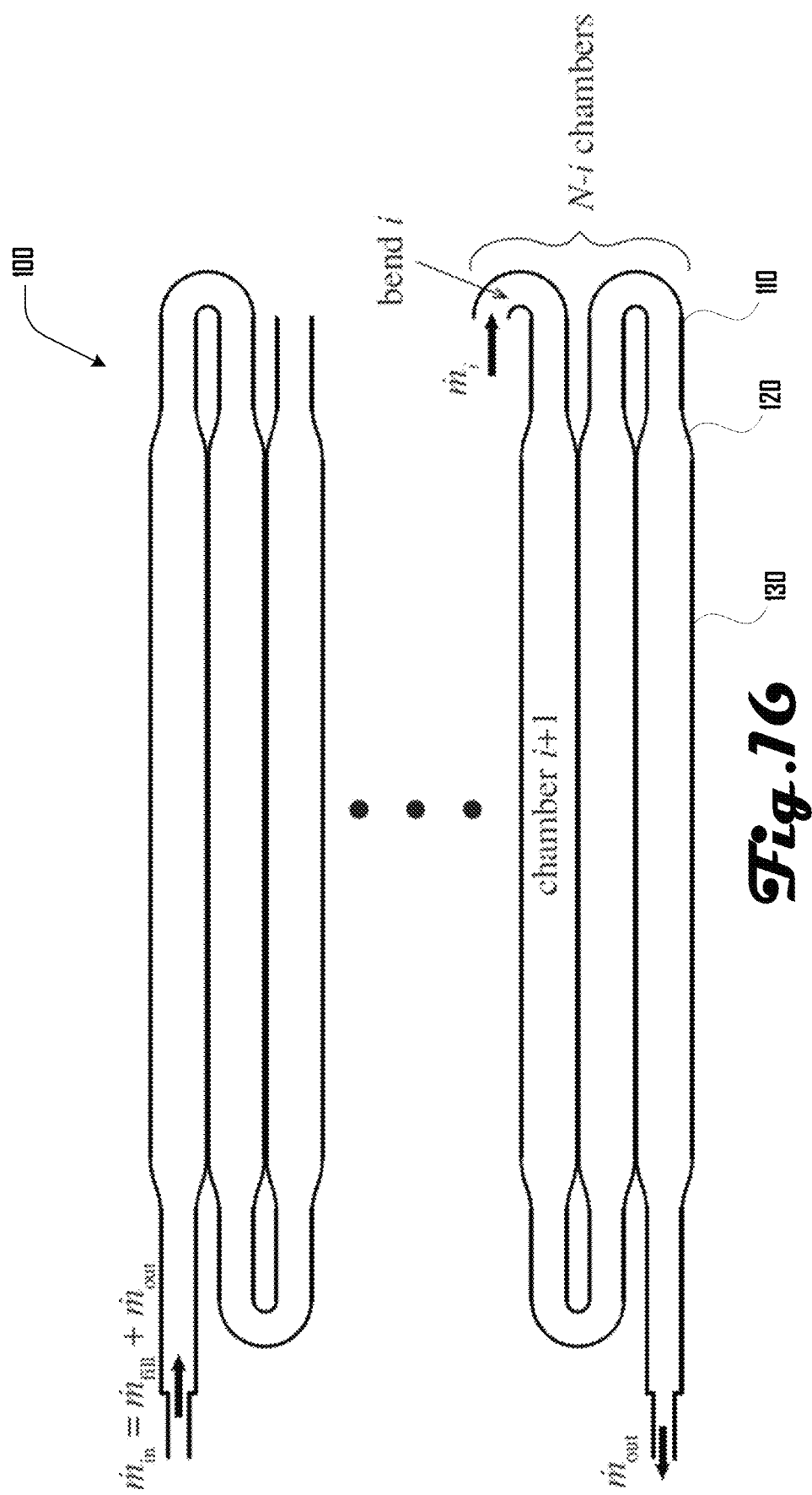
FIG. 16 is a schematic showing a tank having i+3 chambers.

FIG. 16 is a schematic showing a tank 100 having i+3 chambers 130. In various embodiments, increasing or decreasing the number of chambers 130 in a tank 100 can change fluid circulation through a tank 100. For example, decreasing the number of chambers 130 can also increase circulation through decreased flow resistance. This effect can be more prominent for tanks 100 with smaller diameters of corrugations 111. In some examples, additional chambers 130 can add a negligible amount of flow resistance for some tank geometries. While various embodiments can have any suitable plurality of chambers 130, in some embodiments it can be desirable to configure a tank 100 for a capacity of 7-10 kg regardless of the number of chambers 130.

In some embodiments, it can be desirable to split a tank into multiple units. For example, splitting a tank into multiple units can increase the amount of gas circulation, since the diameter of the Venturi nozzle 1405 can be decreased due to less mass flow per tank, thrill, being required.

In various embodiments, it can be desirable to make the Venturi nozzle 1405 as small as possible so that Venturi nozzle 1405 provides as much suction pressure as possible without choking the flow. In further embodiments, it can be desirable to reduce the hydraulic resistance of the tank 100 (e.g., the tubing portions 130, connector portions 110, and the like) as much as possible. For example, in some embodiments reducing the hydraulic resistance of the tank 100 can be done by increasing the diameter of corrugations 105, making the connector portions 110 as short and/or a wide as possible, and the like. In some examples, a purpose of one or both of such elements can be to enable as high a ratio of $\dot{m}_{out}/\dot{m}_{fill}$, as possible.

Also, while various embodiments discussed herein relate to introducing fluid into a tank 100, various embodiments can be employed similarly during defueling, which can limit the temperature variations in the tank 100 during defueling and/or can reduce the temperature drop in the tank 100 during defueling. Additionally, while some examples herein may be discussed in relation to gas, in further embodiments any suitable fluid can be used to fill a tank 100 or be held within a tank 100, including one or both of liquids and gases. Also, while hydrogen gas storage tanks are discussed in some embodiments, any other suitable fluid fuel can fill and be held within a tank 100 in further embodiments, including natural gas, oxygen, methane, propane, acetylene, or the like. Additionally, some embodiments can include use of any suitable non-fuel gasses.

In various embodiments, the Venturi 1400 can be part of a passive filling system that does not require control devices, temperature sensors, and the like. In other words, in some examples, the fluid flow through the Venturi 1400 solely drives recirculation. However, in further embodiments, the Venturi 1400 can include active control. For example one embodiment can include Venturi recirculation with a variable diameter of the Venturi nozzle 1405. Another embodiment can include Venturi recirculation combined with end switching.

Figure 17:
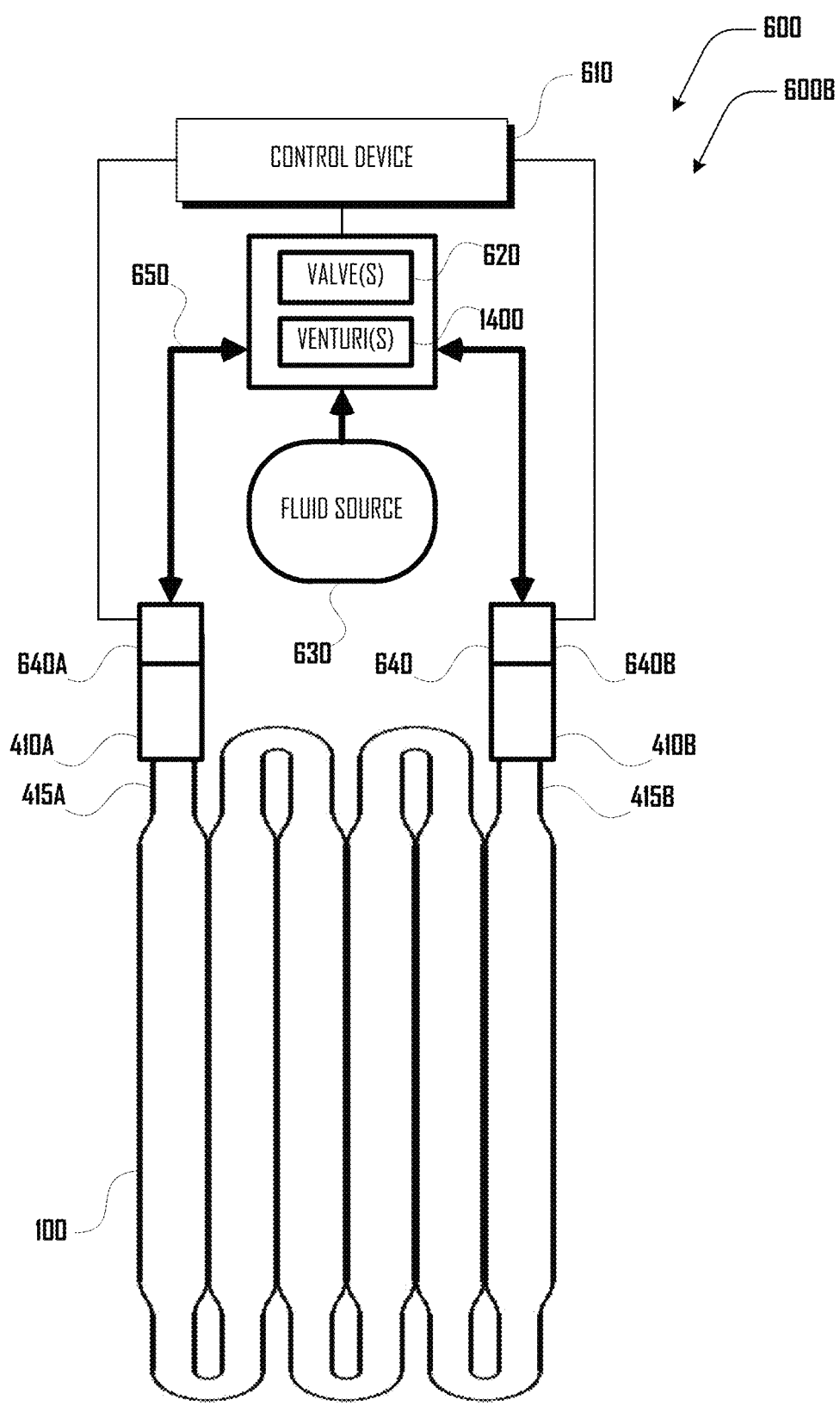
FIG. 17 is a block diagram of a tank filling system in accordance with another embodiment.

Turning to FIG. 17, a tank filling system 600 of another embodiment 600B is illustrated that comprises a control device 610 that drives a valve assembly 620 associated with one or more Venturi 1400 to direct fluid from a fluid source 630 to filling couplers 640 via fluid lines 650. The filling couplers 640 can be removably coupled to fittings 410 on ends 415 of a tank 100. More specifically, a first filling coupler 640A is removably coupled to a first fitting 410A at a first end 415A of the tank 100, and a second filling coupler 640B is removably coupled to a second fitting 410B at a second end 415B of the tank. The control device 610 can be operably connected to the filling couplers 640 as described herein.

The control device can comprise any suitable computing system or computing device, which can receive data from one or more sensors associated with the fitting couplers 640, tank 100, or the like, via wired and/or wireless communication. The control device 610 can control the one or move valves 620 to control flow of fluid from the fluid source 630 to the ends 415 of the tank 100 via the fluid lines 650 and control the flow of fluid from the ends 415 of the tank 100 to the one or more Venturi assembly 1400. Although one example configuration of valves 620 and one or more Venturi assembly 1400 is illustrated in FIG. 17, it should be clear that any suitable configuration of one or more valves, one or more Venturi assembly, or the like, is within the scope and spirit of the present disclosure, and the example configuration of FIG. 17 should not be construed to be limiting.

For example, the illustration of FIG. 17 should not be construed to exclude a configuration of a filling system 600 having valves collocated at the fluid source 630, fitting couplers 640, or the like. In another example, a filling system 600 can include the configuration as shown in FIGS. 14 and 15 where a single Venturi assembly 1400 introduces fluid to the first end 415A of the tank 100 with the second end 415B of the tank 100 providing an outlet 1420 that feeds into the Venturi chamber 1405.

In some embodiments, the filling system 600 can be non-alternating. In other words, the filling system 600 may not switch the filling end 415 between the first and second ends 415A, 415B. Accordingly, in some embodiments, the first end 415A can remain the inlet 1415 and the second end can remain the outlet 1420. However, in further embodiments, the inlet 1415 can switch between the first and second ends 415A, 415B with the outlet 1420 similarly switching between the first and second ends 415A, 415B. For example, the valves 620 can be configured to switch the inlet 1415 and outlet 1420.

In another example, the filling system can comprise a first and second Venturi assembly 1400 that are respectively associated with first and second ends 415A, 415B with the first Venturi assembly 1400 having the first end 415A as the inlet 1415 and the second end 415B as the outlet 1420. The second Venturi assembly 1400 can have the first end 415A as the outlet 1420 and the second end 415B as the inlet 1415. In such examples, the valve(s) 620 can switch between the first and second Venturi to switch filling from the first and second ends 415A, 415B.

Such switching of filling between the first and second ends 415A, 415B having one or more Venturi can be achieved as discussed herein and as illustrated in FIG. 7, with the switching between the inlet filling end 1415 also including switching of the outlet end 1420.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

What is claimed is:

1. A method of filling an elongated folded tank having a first and second end, the method comprising:
    coupling a filling coupler with a Venturi filling system that is coupled with an elongated folded tank having a first end and a second end, the Venturi filling system comprising:
        a Venturi assembly having a Venturi nozzle that introduces a first flow of a fluid from a fluid source to a Venturi mixing chamber of the Venturi assembly, the Venturi mixing chamber communicating with the first end of the elongated folded tank to introduce the fluid to the first end and into an interior cavity of the tank, the Venturi assembly further including a suction inlet communicating with the second end and coupled with the Venturi mixing chamber such that a second flow of fluid that originates from the second end of the tank flows into the Venturi mixing chamber and mixes with the first flow of the fluid within the Venturi mixing chamber, wherein the Venturi nozzle of the Venturi assembly is configured to have a varying diameter during filling so that a nozzle diameter $D_{noz}$ is increased and decreased during filling;
    wherein the elongated folded tank extends between the first end and second end and the elongated folded tank includes:
        a plurality of elongated rigid tubing portions having a first diameter,
        a plurality of connector portions having a second diameter that is smaller than the first diameter and having flexible corrugations and a rigid cuff, and
        taper portions disposed between and coupling successive tubing portions and connector portions;
    introducing the first flow of the fluid into the first end of the tank via the filling coupler and the Venturi assembly to generate the second flow of fluid that originates from the second end of the tank that flows into the Venturi mixing chamber via the suction inlet and mixes with the first flow of the fluid within the Venturi mixing chamber;
    determining that tank filling is complete;
    stopping any fluid flow to the tank; and
    de-coupling the filling coupler from the Venturi filling system.

2. The method of claim 1, wherein the determining that tank filling is complete is performed by a computing device automatically without human interaction.

3. The method of claim 1, wherein the first and second flows of the fluid comprise hydrogen.

4. The method of claim 1, wherein the Venturi assembly and tank operate with a maximum mass flow rate Thrill of 60 g/s and a maximum pressure ramp rate of less than or equal to 28.5 MPa/min.

5. The method of claim 1, wherein Venturi assembly is disposed directly at the first end of the tank such that a first length of fluidic coupling between the Venturi assembly and first end of the tank is substantially shorter than the length of a second length of fluidic coupling between the Venturi assembly and second end of the tank.

6. A system comprising:
    an elongated folded tank that extends between a first and second end of the tank, the elongated folded tank including:
        a plurality of elongated rigid tubing portions having a first diameter,
        a plurality of connector portions having a second diameter that is smaller than the first diameter and having flexible corrugations, and
        taper portions disposed between and coupling successive tubing portions and connector portions; and
    a Venturi filling system coupled to the elongated folded tank, the Venturi filling system comprising:
        a first filling coupler coupled to a first set of fittings disposed at a first tank end;
        a second filling coupler coupled to a second set of fittings disposed at a second tank end; and
        a Venturi assembly that includes:
            a Venturi mixing chamber, the Venturi mixing chamber communicating with the first filling coupler to introduce fluid to the first tank end and into an interior cavity of the tank;
            a Venturi nozzle configured to introduce a first flow of fluid from a fluid source to the Venturi mixing chamber of the Venturi assembly, wherein the Venturi nozzle of the Venturi assembly is configured to have a varying diameter during filling so that a nozzle diameter $D_{noz}$ is increased and decreased during filling; and
            an suction inlet communicating with the second filling coupler and coupled with the Venturi mixing chamber such that where a second flow of fluid originates from the second end of the tank, the second flow of fluid flows into the Venturi mixing chamber and mixes with the first flow of the fluid within the Venturi mixing chamber.

7. The system of claim 6, wherein the first flow of the fluid comprises hydrogen.

8. The system of claim 6, wherein the Venturi assembly and tank operate with a maximum mass flow rate $\dot{m}_{fill}$ of 60 g/s.

9. The system of claim 6, wherein the Venturi assembly and tank operate with a maximum pressure ramp rate of less than or equal to 28.5 MPa/min.

10. The system of claim 6, wherein Venturi assembly is disposed at the first end of the tank with a first length of fluidic coupling between the Venturi assembly and first end of the tank being substantially shorter than the length of a second length of fluidic coupling between the Venturi assembly and second end of the tank.

11. A Venturi filling system comprising:
a first filling coupler configured to be coupled to a first set of fittings disposed at a first tank end of a tank;
a second filling coupler configured to be coupled to a second set of fittings disposed at a second tank end of the tank; and
a Venturi assembly that includes:
  a Venturi mixing chamber, the Venturi mixing chamber communicating with the first filling coupler;
  a Venturi nozzle configured to introduce a first flow of fluid from a fluid source to the Venturi mixing chamber of the Venturi assembly; and
  a suction inlet communicating with the second filling coupler and coupled with the Venturi mixing chamber and configured to receive a second flow of fluid originates from the second filling coupler such that the second flow of fluid flows into the Venturi mixing chamber and mixes with the first flow of the fluid within the Venturi mixing chamber,
  wherein the Venturi nozzle of the Venturi assembly is configured to have a varying diameter during filling so that a nozzle diameter $D_{noz}$ is increased and decreased during filling of a tank that the Venturi filling system is coupled to.

12. The Venturi filling system of claim 11, wherein the Venturi assembly operates with a maximum mass flow rate Thrill of 60 g/s.

13. The Venturi filling system of claim 11, wherein the Venturi assembly operates with a maximum pressure ramp rate of less than or equal to 28.5 MPa/min.

14. The Venturi filling system of claim 11, wherein the tank includes:
a plurality of elongated rigid tubing portions having a first diameter,
a plurality of connector portions having a second diameter that is smaller than the first diameter and having flexible corrugations and a rigid cuff, and
taper portions disposed between and coupling successive tubing portions and connector portions.

* * * * *